(12) United States Patent  (10) Patent No.: US 8,982,304 B2
Jung et al.  (45) Date of Patent: Mar. 17, 2015

(54) DISPLAY PANEL AND METHOD OF MANUFACTURING THE SAME

(75) Inventors: Jin-Soo Jung, Hwaseong-si (KR); Jun-Woo Lee, Seongnam-si (KR); Baek-Kyun Jeon, Yongin-si (KR); Joo-Seok Yeom, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 94 days.

(21) Appl. No.: 13/481,371

(22) Filed: May 25, 2012

(65) Prior Publication Data

US 2013/0050630 A1 Feb. 28, 2013

(30) Foreign Application Priority Data

Aug. 25, 2011 (KR) ........................ 10-2011-0084972

(51) Int. Cl.
*G02F 1/1337* (2006.01)
*G02F 1/13* (2006.01)

(52) U.S. Cl.
CPC .......... *G02F 1/13378* (2013.01); *G02F 1/1303* (2013.01); *G02F 1/133711* (2013.01); *G02F 1/133753* (2013.01); *G02F 2001/133757* (2013.01); *B32B 2457/202* (2013.01)

USPC .......................................................... 349/123

(58) Field of Classification Search
CPC ..................................................... G02F 1/1337
USPC ................................................. 349/159, 123
See application file for complete search history.

(56) References Cited

U.S. PATENT DOCUMENTS

| | | | |
|---|---|---|---|
| 2010/0002177 A1* | 1/2010 | Chien et al. .................... | 349/124 |
| 2011/0085097 A1* | 4/2011 | Lee et al. ........................ | 349/33 |
| 2011/0097961 A1* | 4/2011 | Oh et al. ........................ | 445/24 |

* cited by examiner

*Primary Examiner* — Richard Kim
*Assistant Examiner* — Edmond Lau
(74) *Attorney, Agent, or Firm* — F. Chau & Associates, LLC

(57) ABSTRACT

Air is sprayed on the first polymer film along a first negative direction in the sub pixel areas of an n-th row of a unit pixel area, and air is sprayed on the first polymer film along a first positive direction in the sub pixel areas of an (n+1)-th row of the unit pixel area to form a first alignment layer. Air is sprayed on the second polymer film along a second negative direction crossing the first negative direction in the sub pixel areas of an n-th column of the unit pixel area, and air is sprayed on the second polymer film along a second positive direction crossing the first positive direction in the sub pixel areas of an (n+1)-th column of the unit pixel area to form a second alignment layer.

16 Claims, 15 Drawing Sheets

DISPLAY PANEL AND METHOD OF MANUFACTURING THE SAME

CROSS-REFERENCE TO RELATED APPLICATION

This application claims priority to Korean Patent Application No. 2011-84972, filed on Aug. 25, 2011, and all the benefits accruing therefrom under 35 U.S.C. §119, the contents of which in its entirety is herein incorporated by reference.

TECHNICAL FIELD

Exemplary embodiments of the present invention relate to a display panel and a method of manufacturing the display panel. More particularly, exemplary embodiments of the present invention relate to a display panel having a multi-domain configuration and a method of manufacturing the display panel.

DISCUSSION OF THE RELATED ART

A liquid crystal display (LCD) apparatus is a type of flat panel display apparatus, and includes two substrates in which field generating electrodes including a pixel electrode and a common electrode are formed, a liquid crystal layer interposed between two substrates and a polarizing plate attached on outer surfaces of the substrates.

An LCD apparatus having a vertically aligned mode, in which major axes of liquid crystal molecules are vertically aligned with respect to a substrate in the absence of an electric field, has been used. A contrast ratio in a vertically aligned mode LCD apparatus is relatively large, and a standard viewing angle is relatively wide.

In an LCD apparatus having a vertically aligned mode, a cutting portion, for example, a slit formed through an electric field generating electrode or a protrusion formed on an electric field generating electrode, may be formed to increase the standard viewing angle. The cutting portion and the protrusion influence a tilt direction of the liquid crystal molecules near the cutting portion or the protrusion. Cutting portions or protrusions may be formed such that the tilt direction of the liquid crystal molecules may be dispersed to several directions to increase the standard viewing angle.

However, cutting portions and protrusions decrease a transmissive rate of a pixel. Thus, techniques of increasing the viewing angle of an LCD apparatus without decreasing the transmissive rate are desired.

SUMMARY

Exemplary embodiments of the present invention provide a display panel capable of increasing a transmissive rate and a viewing angle, and a method of manufacturing the display panel.

According to an exemplary embodiment of the present invention, in a method of manufacturing a display panel, a first polymeric film is formed on a first base substrate including a plurality of unit pixel areas, and each of the unit pixel areas includes a plurality of sub pixel areas arranged in a matrix shape. Air is sprayed on the first polymeric film along a first negative direction in the sub pixel areas of an n-th (n is a natural number) row of a unit pixel area, and air is sprayed on the first polymeric film along a first positive direction opposite to the first negative direction in the sub pixel areas of an (n+1)-th row of the unit pixel area to form a first alignment layer. A second polymeric film is formed on a second base substrate including the unit pixel areas and each of the unit pixel areas includes the sub pixel areas arranged in a matrix shape. A second alignment layer is formed by spraying air on the second polymeric film in a second negative direction crossing the first negative direction in the sub pixel areas of an n-th column of the unit pixel area, and by spraying air on the second polymeric film along a second positive direction crossing the first positive direction in the sub pixel areas of an (n+1)-th column of the unit pixel area to form a second alignment layer. A liquid crystal material is injected between the first and second base substrates and sealed.

In an example embodiment, sub unit pixel areas adjacent to each other may be symmetrically aligned with respect to a boundary between the adjacent sub unit pixel areas.

In an example embodiment, a polymer material may be sprayed on each of the first and second base substrates using an inkjet method to form each of the first and second polymeric films.

In an example embodiment, the polymer material may be sprayed on the sub pixel areas on the first base substrate at the n-th row along the second negative direction and the polymer material may be sprayed on the sub pixel areas on the first base substrate at the (n+1)-th row along the second positive direction, in forming the first polymeric film.

In an example embodiment, the polymer material may be sprayed on the sub pixel areas on the second base substrate at the n-th column along the second negative direction and the polymer material may be sprayed on the second base substrate on the sub pixel areas at the (n+1)-th column along the second positive direction, in forming the second polymeric film.

In an example embodiment, a signal line capable of transmitting a driving signal of the display panel may be formed on the first base substrate and a light blocking layer may be formed to be disposed at boundaries between the unit pixel areas adjacent to each other on the second base substrate.

In an example embodiment, a first boundary line may be disposed at a boundary between the sub pixel areas adjacent to each other along the first positive or negative direction on the first base substrate In an example embodiment, the first boundary line may include a material substantially the same as a material of the signal line.

In an example embodiment, a second boundary line may be formed to be disposed at a boundary between the sub unit pixel areas adjacent to each other along the second positive or negative direction on the second base substrate.

In an example embodiment, the second boundary line may include a material substantially the same as a material of the light blocking layer.

In an example embodiment, an amount of air sprayed on a boundary area between the sub pixel areas adjacent to each other of the first polymeric film may be larger than an amount of air sprayed on the sub pixel areas of the first polymeric film.

In an example embodiment, an amount of air sprayed on a boundary area between the sub pixel areas adjacent to each other of the second polymeric film may be larger than an amount of air sprayed on the sub pixel areas of the second polymeric film.

According to an exemplary embodiment of the present invention, in a method of manufacturing a display panel, a polymeric film is formed on a first base substrate. The first base substrate includes a plurality of unit pixel areas and each of the unit pixel areas includes a plurality of sub pixel areas arranged in a matrix shape. Air is sprayed on the polymeric film along a first negative direction in the sub pixel areas of an n-th (n is a natural number) row of a unit pixel, and air is sprayed on the polymeric film along a first positive direction opposite to the first negative direction in the sub pixel areas of an (n+1)-th row of the unit pixel area. The air is also sprayed on the polymeric film along a second negative direction crossing the first negative direction in the sub pixel areas of an n-th column of the unit pixel area and air is sprayed on the polymeric film along a second positive direction crossing the first positive direction in the sub pixel areas of an (n+1)-th column of the unit pixel area, to form a first alignment layer. A second alignment layer is formed on a second base substrate. A liquid crystal material is injected between the first and second base substrates and is sealed.

In an example embodiment, a signal line capable of transmitting a driving signal of the display panel may be formed on the first base substrate. A first boundary line may be formed to be disposed at a boundary between the sub unit pixel areas adjacent to each other along the first positive or negative direction, on the first base substrate. A second boundary line may be formed to be disposed at a boundary between the sub unit pixel areas adjacent to each other along the second positive or negative direction, on the first base substrate.

In an example embodiment, the first and second boundary lines may include a material substantially the same as a material of the signal line.

In an example embodiment, a light blocking layer may be formed to be disposed at boundaries between the unit pixel areas adjacent to each other, on the first base substrate. A first boundary line may be formed to be disposed at a boundary between the sub unit pixel areas adjacent to each other along the first positive or negative direction, on the first base substrate. A second boundary line may be formed disposed at a boundary between the sub unit pixel areas adjacent to each other along the second positive or negative direction on the first base substrate.

In an example embodiment, the first and second boundary lines may include a material substantially the same as a material of the light blocking layer.

In an example embodiment, an amount of air sprayed on a boundary area between the sub unit pixel areas of the first polymeric film may be larger than an amount of the air sprayed on the sub pixel areas of the first polymeric film in forming the first alignment layer.

According to an exemplary embodiment of the present invention, a display panel includes a first substrate, a second substrate comprising a second alignment layer, and liquid crystal interposed between the first and second substrates. The first base substrate may include a base substrate, a first alignment layer and first and second boundary lines. The base substrate includes a plurality of unit pixel areas. Each of the unit pixel areas includes a plurality of sub pixel areas arranged in a matrix shape. The first alignment layer is aligned such that a pretilted angle of the sub pixel areas adjacent to each other is symmetric with respect to a boundary between the sub pixel areas adjacent to each other. The first and second boundary lines are formed at the boundary between the sub unit pixel areas adjacent to each other.

According to an exemplary embodiment of the present invention, a display panel includes a first substrate, a second substrate comprising a second alignment layer and liquid crystal interposed between the first and second substrates. The first substrate may include a base substrate and a first alignment layer. The base substrate includes a plurality of unit pixel areas. Each of the unit pixel areas includes a plurality of the sub pixel areas arranged in a matrix shape. The first alignment layer is aligned such that a pretilted angle of the sub pixel areas adjacent to each other, is symmetric with respect to a boundary between the sub pixel areas adjacent to each other, and aligned such that a pretilted angle of the boundary between the sub pixel areas adjacent to each other is larger than the pretilted angle in the sub pixel areas.

A method of manufacturing a display panel, according to an embodiment of the present invention, comprises forming a first polymeric film on a first base substrate, the first base substrate comprising a plurality of unit pixel areas, each of the unit pixel areas comprising a plurality of sub pixel areas, spraying air on the first polymeric film along a first direction in the sub pixel areas of a first row of a unit pixel area, and spraying air on the first polymeric film along a second direction opposite to the first direction in the sub pixel areas of a second row of the unit pixel area to form a first alignment layer, forming a second polymeric film on a second base substrate, the second base substrate comprising the unit pixel areas, each of the unit pixel areas comprising the sub pixel areas, and spraying air on the second polymeric film along a third direction orthogonal to the first direction in the sub pixel areas of a first column of the unit pixel area, and spraying air on the second polymeric film along a fourth direction opposite to the third direction and orthogonal to the second direction in the sub pixel areas of second column of the unit pixel area to form a second alignment layer.

According to the exemplary embodiments of the present invention, multiple domains may be formed in an alignment layer of a unit pixel area without forming an element like a slit pattern or a protrusion pattern so as not to decrease a transmissive rate on an electric field generating electrode like a pixel electrode. As a result, the transmissive rate of the unit pixel area may be increased and a pretilted angle may increase a response rate of a liquid crystal display (LCD), so that the LCD apparatus may display images more effectively.

In addition, the alignment layer is formed by spraying air, so that scratches occurring during formation of the alignment layer may be prevented from being formed on the alignment layer.

BRIEF DESCRIPTION OF THE DRAWINGS

Embodiments of the present invention will become more apparent by describing in detail exemplary embodiments thereof with reference to the accompanying drawings, in which.

DETAILED DESCRIPTION OF EMBODIMENTS OF THE INVENTION

Hereinafter, exemplary embodiments of the present invention will be described in further detail with reference to the accompanying drawings. However, the present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

As used herein, the singular forms, "a," "an" and "the" are intended to include the plural forms as well, unless the context clearly indicates otherwise.

Figure 1:
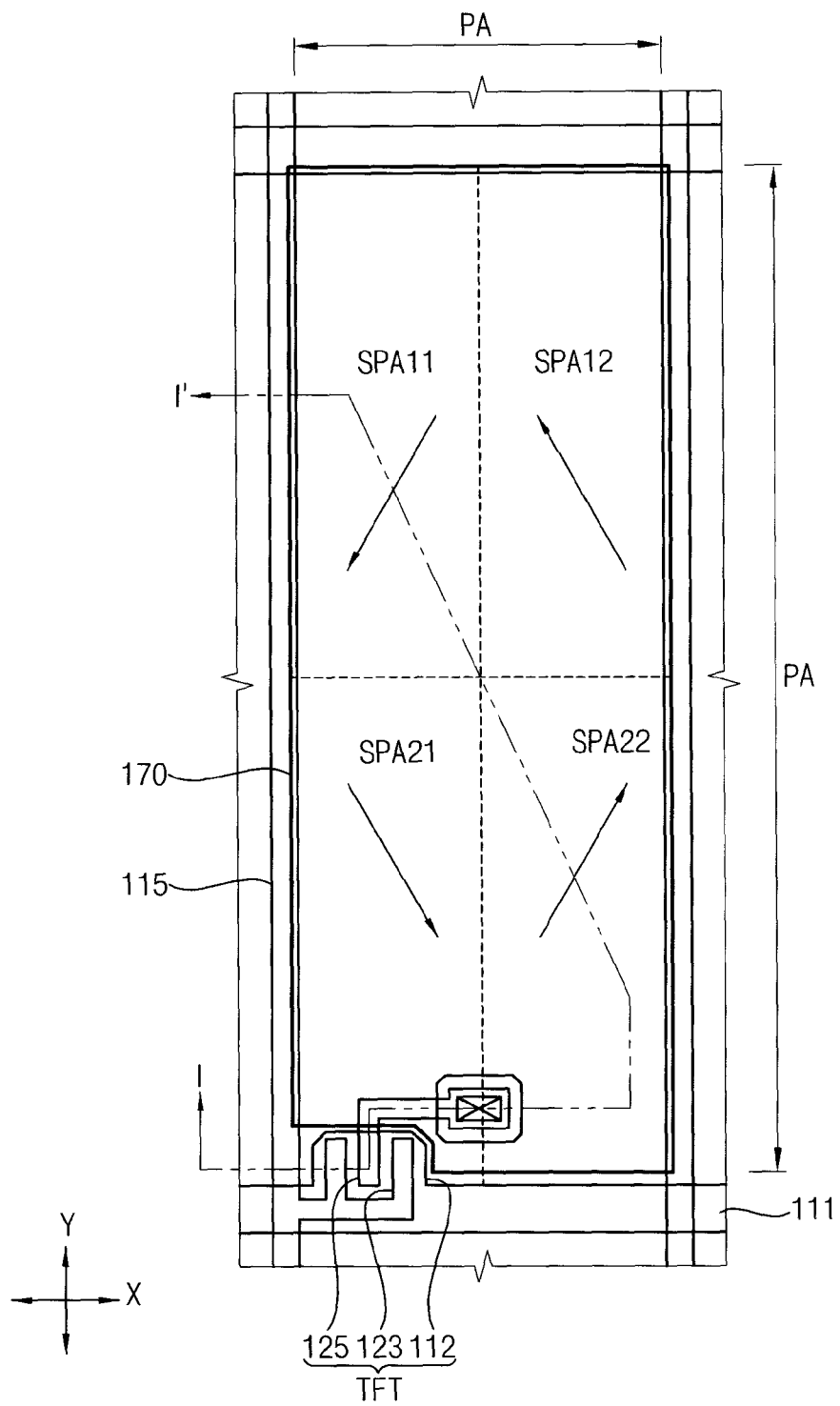
FIG. 1 is a plan view illustrating a portion of a display panel according to an exemplary embodiment of the present invention.
Figure 2:
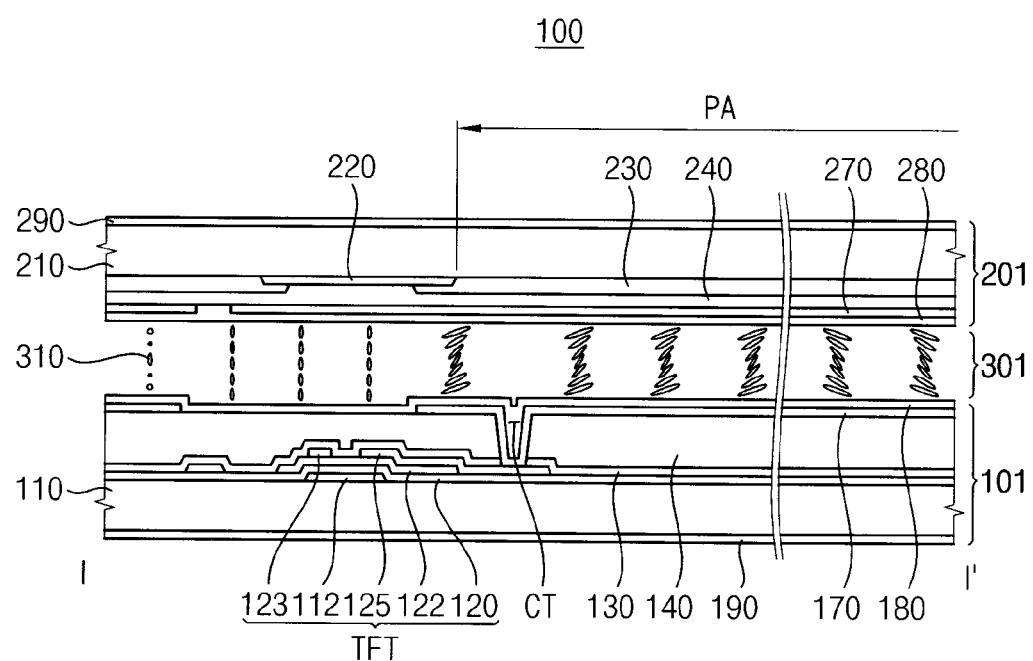
FIG. 2 is a cross-sectional view taken along a line I-I' of FIG. 1.

FIG. 1 is a plan view illustrating a display panel according to an exemplary embodiment of the present invention. FIG. 2 is a cross-sectional view taken along a line I-I' of FIG. 1.

Referring to FIGS. 1 and 2, a display panel 100 according to the present exemplary embodiment includes an array substrate 101, an opposing substrate 201 and a liquid crystal layer 301.

The array and opposing substrates 101 and 201 are alignment substrates according to the present exemplary embodiment and initially align liquid crystal molecules of the liquid crystal layer 301. The liquid crystal molecules are initially aligned with pretilted angles different from each other by a lower alignment layer 180 of the array substrate 101 and an upper alignment 280 of the opposing substrate 201.

For example, a plurality of unit pixel areas PA arranged in a matrix shape is defined in the display panel 101. According to an embodiment, a unit pixel area PA can be divided into four sub-pixel areas SPA11, SPA12, SPA21 and SPA22 by the lower alignment layer 180 of the array substrate 101 and the upper alignment layer 280 of the opposing substrate 201. Referring to FIG. 1, the unit pixel areas are divided into four sub-pixel areas. For example, the unit pixel areas are divided into SPA11 at a first row and a first column, SPA12 at a first row and a second column, SPA21 at a second row and a first column, and SPA22 at a second row and a second column.

Each of the sub-pixel areas SPA11, SPA12, SPA21 and SPA22 are initially aligned with pretilted angles different from each other. Thus, each of the unit pixel areas PA is divided into four domains, resulting in a multi-domain LCD device.

According to an embodiment, the opposing substrate 201 includes a color substrate having R, G and B color filters. The array substrate 101 includes an element substrate driven by an active matrix driving method using a switching element.

The array substrate 101 can have a rectangular shape. Thus, a first direction X is defined as a horizontal or row direction of the array substrate 101 and a second direction Y is defined as a longitudinal or column direction of the array substrate 101.

Figure 3:
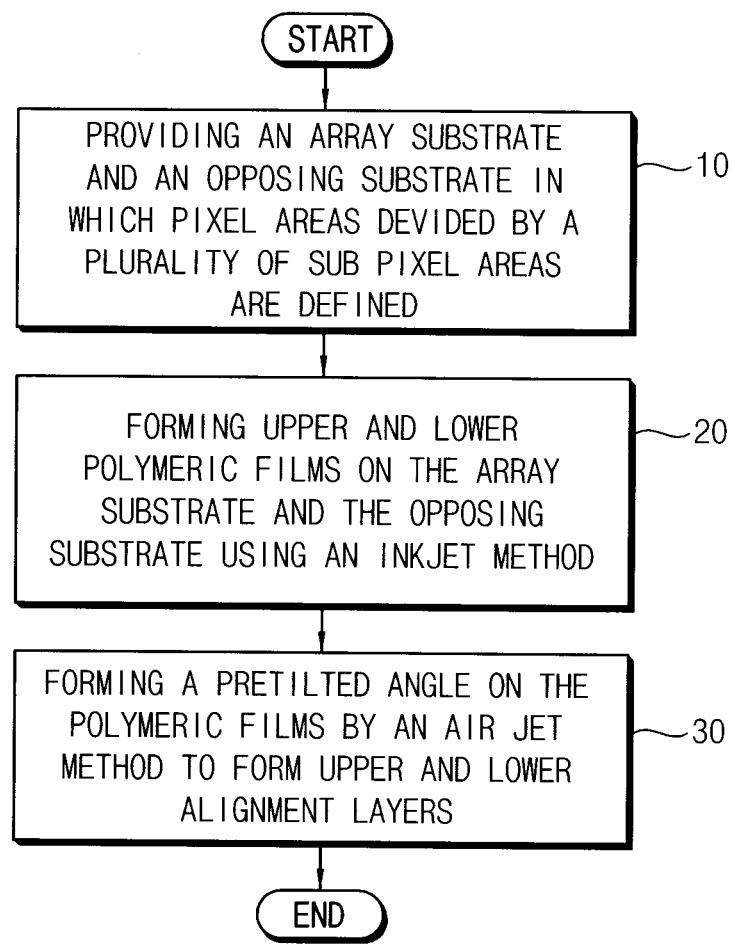
FIG. 3 is a flowchart illustrating a method of manufacturing a display panel, according to an exemplary embodiment of the present invention.

FIG. 3 is a flowchart illustrating a method of manufacturing a display panel according to an embodiment of the present invention.

Referring to FIGS. 1, 2 and 3, the array substrate 101 according to the present exemplary embodiment includes a lower base substrate 110, a plurality of gate lines 111, a plurality of data lines 115, a thin film transistor TFT, a pixel electrode 170 and a lower alignment layer 180.

The opposing substrate 201 includes an upper base substrate 210, a light blocking pattern 220, a color filter pattern 230, an over coating layer 240, a common electrode 270 and an upper alignment layer 280.

In the present exemplary embodiment, the unit pixel area PA has a rectangular shape. Alternatively, the unit pixel area PA may have various shapes.

In a method of manufacturing a display panel, according to an embodiment of the present invention, the array and opposing substrates 101 and 201, in which the unit pixel areas PA are defined, are provided (step 10).

According to an embodiment, a gate metal is deposited on the lower base substrate 110 by, for example, sputtering, and the gate lines 111 and a gate electrode 112 protruded from the gate lines 111 are formed by, for example, photolithography. The gate lines 111 extend along the first direction X on the lower base substrate 110.

A gate insulating layer 120 and a semiconductor pattern 122 are formed on the lower base substrate 110. The gate insulating layer 120 is formed on the gate lines 111. The semiconductor pattern 122 is deposited and etched on the gate insulating layer 120 to form the semiconductor pattern 122. The semiconductor pattern 122 is formed on the gate insulating layer 120, which is formed on the gate electrode 112.

A data metal layer is deposited and patterned on the gate insulating layer 120 to form the data line 115, a source electrode 123 and a drain electrode 125.

The data lines 115 extend along the second direction Y on the gate insulating layer 120. The source electrode 123 protrudes from the data lines 115 and is formed on the semiconductor pattern 122 which is formed on the gate electrode 112.

The drain electrode 125 is spaced apart from the source electrode 123 on the semiconductor pattern 122 and formed on the gate insulating layer 120.

A thin film transistor TFT includes the gate electrode 112, the gate insulating layer 120, the semiconductor pattern 122, the source electrode 123 and the drain electrode 125.

A passivation layer 130 is formed on the lower base substrate 110 on which the data line 115 is formed. An organic insulating layer 140 is formed on the passivation layer 130. Contact holes CT, through which the drain electrode 125 is partially exposed, are formed through the organic layer 140 and the passivation layer 130.

A transparent conductive material layer is deposited on the organic layer 140 and patterned to form the pixel electrode 170. The pixel electrode 170 makes contact with the drain electrode 125 through the contact holes CT. The transparent conductive material includes, for example, indium tin oxide (ITO) or indium zinc oxide (IZO).

The opposing substrate 201 includes an upper base substrate 210, a light blocking pattern 220, a color filter pattern 230, an over coating layer 240, a common electrode 270 and an upper alignment layer 280.

The position of the light blocking pattern 220 corresponds to the position of the gate lines 111, the data lines 115 and the thin film transistor TFT. The position of the color filter pattern 230 formed on the upper base substrate 210 corresponds to the pixel area PA. The color filter pattern 230, for example, can include red, green and blue filters. According to an embodiment, the red, green and blue filters are sequentially formed on each of the pixel areas PA along the first direction X.

The over coating layer 240 covers the color filter pattern 230 and the light blocking pattern 220, and the common electrode is formed on the over coating layer 240. According to an embodiment, the common electrode 270 includes a transparent conductive material. The transparent conductive material includes, for example, indium tin oxide (ITO) or indium zinc oxide (IZO).

A lower polymeric film 180a is formed on the pixel electrode 170 (see FIG. 4), and an upper polymeric film (not shown) is formed on the common electrode 270 (step 20) According to an embodiment, the lower polymeric film 180a and the upper polymeric film are formed by an inkjet process. As described further below, the lower and upper polymeric films are processed to form the alignment layers 180 and 280.

Figure 4:
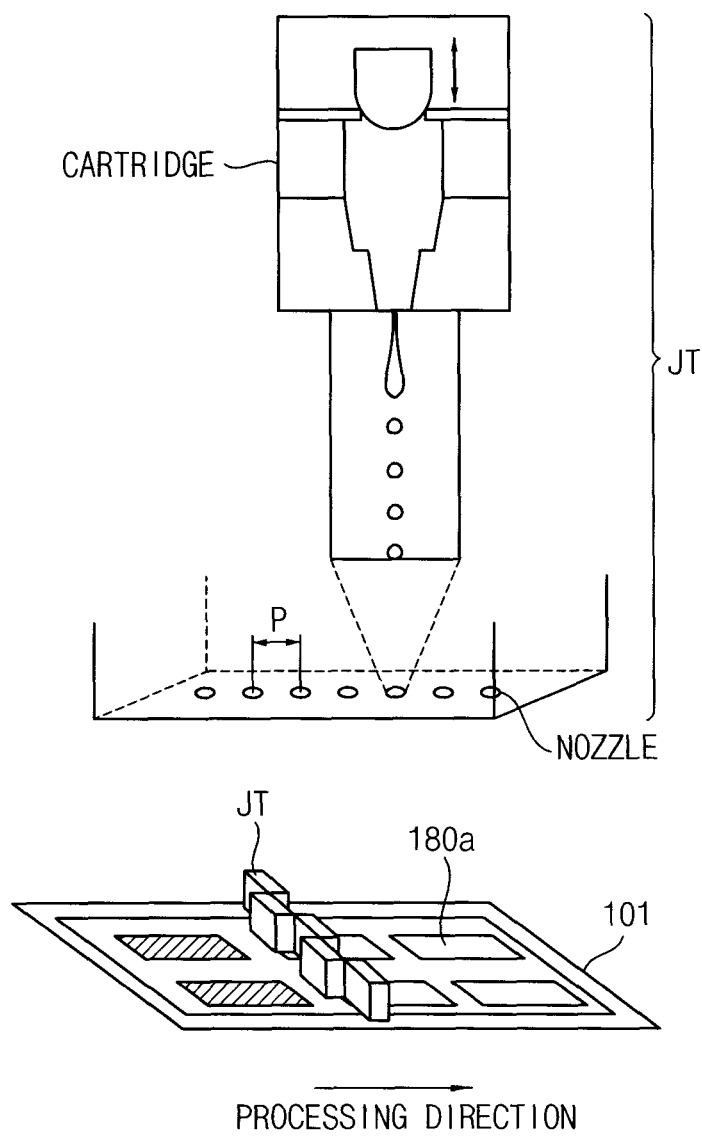
FIG. 4 is a schematic diagram illustrating an ink jet apparatus.

FIG. 4 is a schematic diagram illustrating an ink jet apparatus JT.

Referring to FIG. 4, the ink jet apparatus JT includes an inkjet head including a polymer material therein. The polymer material with which the inkjet head is filled is sprayed on the substrate through a nozzle formed at an edge portion of the ink jet apparatus JT to form the upper and lower polymeric films. At least one nozzle is formed at the edge portion of the ink jet apparatus JT. A distance P between the nozzles adjacent to each other is set at a predetermined level to uniformly spray the polymer material on the substrates.

FIGS. 5A, 5B, 5C and 5D are schematic diagrams illustrating methods of spraying a polymer material by the ink jet apparatus JT in FIG. 4.

Figure 5A:
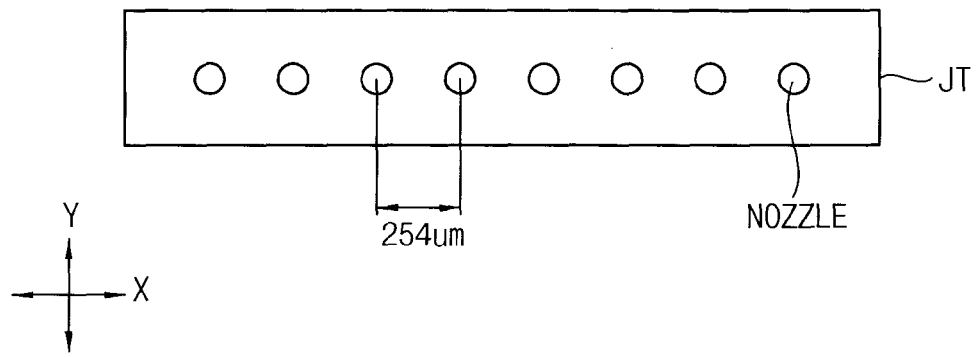
FIGS. 5A, 5B, 5C and 5D are schematic diagrams illustrating methods of spraying a polymer material using the ink jet apparatus of FIG. 4.

Referring to FIG. 5A, the nozzles of the ink jet apparatus JT are spaced apart from each other by a distance of about 254 μm along the first direction X. When the ink jet apparatus JT moves along or substantially parallel to the second direction Y, the polymer materials are formed at the distance of about 254 μm from each other along the first direction X. In addition, the polymer materials form a plurality of columns parallel with or substantially parallel with the second direction Y.

Figure 5B:
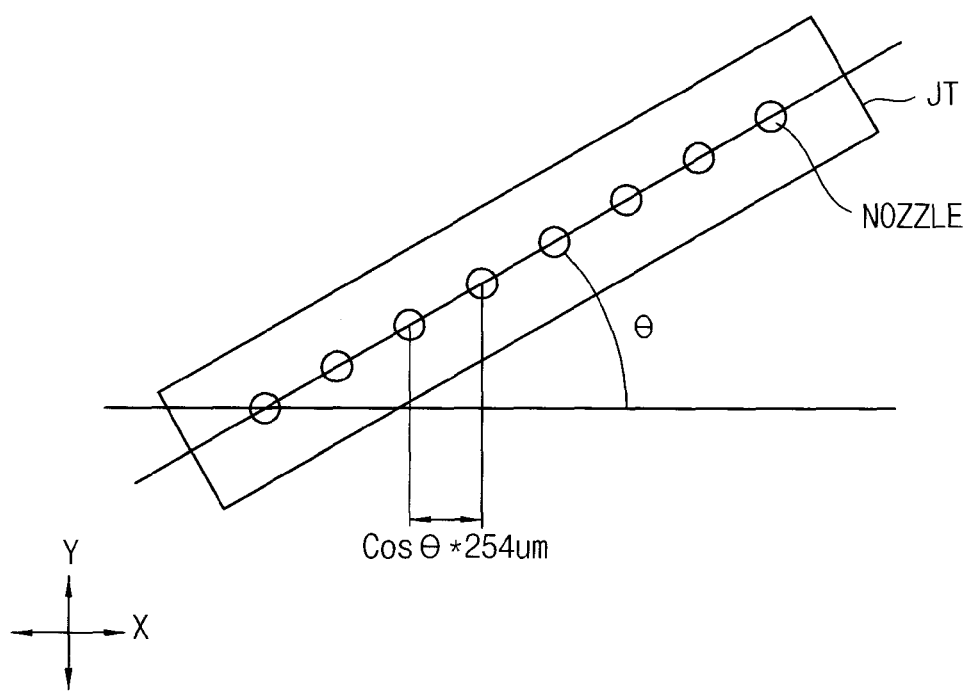

Referring to FIG. 5B, according to an embodiment, the nozzles of the ink jet apparatus JT are spaced apart from each other by the distance of about 254 μm. In this example, the ink jet apparatus JT is rotated by an angle θ with respect to the first direction X and the ink jet apparatus JT moves along the second direction Y. In this case, the polymer materials are spaced apart from each other by a distance of about cos θ*254 μm along the first direction X. In addition, the polymer materials form a plurality of columns substantially parallel with the second direction Y.

Figure 5C:
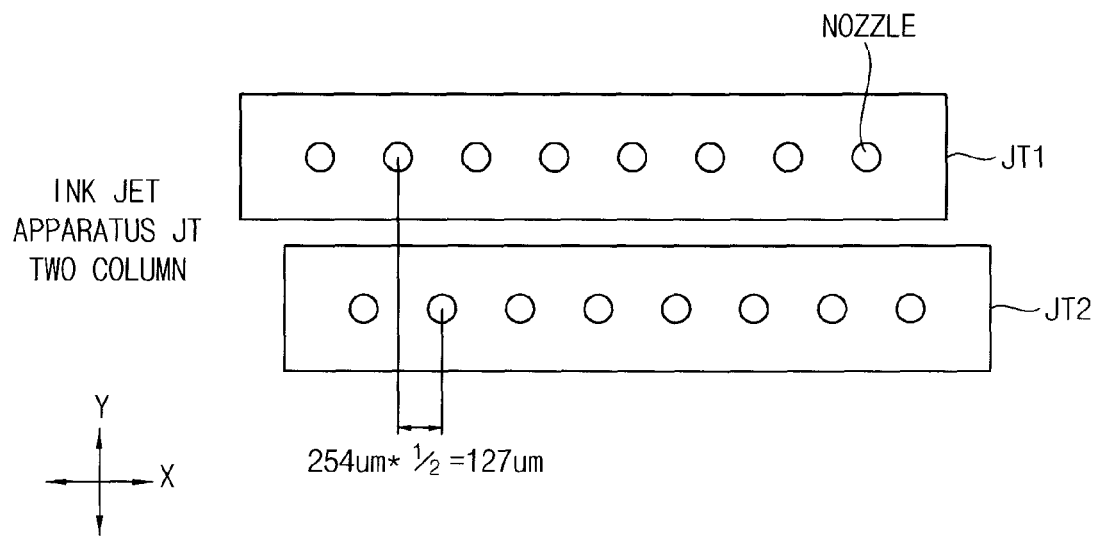

Referring to FIG. 5C, according to an embodiment, at least two ink jet apparatuses JT1 and JT2 are disposed parallel or substantially parallel to each other to spray the polymer material. In this case, the nozzles of each of the ink jet apparatuses JT1 and JT2 are alternately disposed with each other. For example, nozzles of the second ink jet apparatus JP2 are disposed between nozzles of the first ink jet apparatus JP1. When the first and second ink jet apparatuses JT1 and JT2 move parallel or substantially parallel with the second direction Y, the polymer materials are spaced apart from each other by a distance of about 254/2 μm or 127 μm along the first direction X. In addition, the polymer materials are formed such that a plurality of columns of the polymer materials are parallel or substantially parallel with the second direction Y.

According to an embodiment, when N ink jet apparatuses JT are disposed parallel or substantially parallel to each other, the polymer materials are spaced apart from each other by a distance of about 254/N μm along the first direction X, wherein N is a natural number.

Figure 5D:
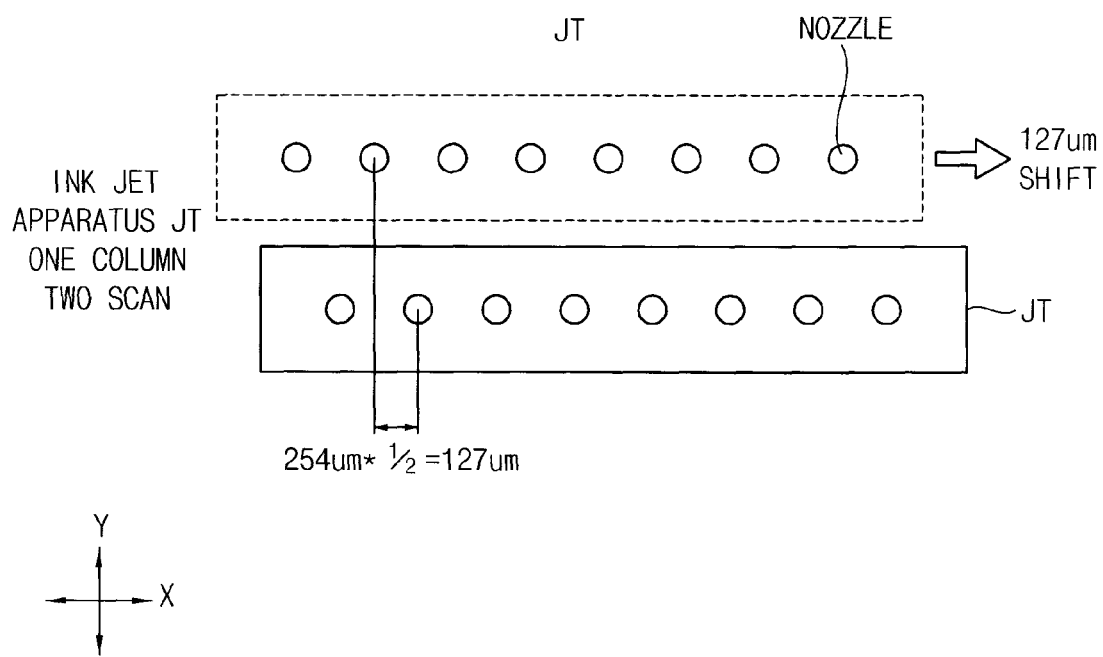

Referring to FIG. 5D, the polymer material is sprayed using one ink jet apparatus JT. In this case, the ink jet apparatus JT moves along the second direction Y and shifts along the positive X direction by about 254/2 μm or 127 μm. According to an embodiment, in a subsequent move along the second direction Y, the inkjet apparatus JT shifts back along the negative X direction by about 254/2 μm or 127 μm. The shifting can continue back and forth depending on a desired length of columns of polymer material. According to an embodiment, the polymer materials are spaced apart from each other by a distance of about 254/2 μm or 127 μm. Also, depending on the distance of the shifting, the distance that the polymer materials are spaced apart from each other can vary, and be, for example, 254/N μm along the first direction X, where N is natural number. In addition, the polymer material forms a plurality of columns parallel with or substantially parallel with the second direction Y.

When the ink jet apparatus JT moves along the second direction Y and shifts back and forth along the first direction X as described above by about 254/N μm, a distance between the polymer materials is about 254/N μm along the first direction X.

In the present exemplary embodiment, the ink jet apparatus JT moves and the polymer material is sprayed by the method illustrated in FIG. 5A, but embodiments are not limited thereto. Alternatively, according to conditions of forming the alignment layer, the polymer material may be sprayed according to various methods, including, but not limited to, the methods described above.

In addition, although not shown in FIGS. 5A and 5D, the polymer material may be sprayed with various distances from each other according to different constant distances between the nozzles, or different varying distances between the nozzles.

TABLE 1

| Processing Factors | Increase of Thickness of Polymeric Film | Decrease of Thickness of Polymeric Film |
|---|---|---|
| Spraying frequency | Increase | Decrease |
| Speed of printing polymer material | Decrease | Increase |
| Concentration of polymer material | Increase | Decrease |
| Number of ink jet apparatuses | Increase | Decrease |
| Distance between ink jet apparatuses | Decrease | Increase |
| Discharging rate of polymer material | Increase | Decrease |
| Viscosity of polymer material | Increase | Decrease |

In Table 1, processing factors affecting an increase or decrease of the thickness of the polymeric film are shown.

Referring to Table 1, a spraying frequency of the ink jet apparatus JT is controlled to determine a distance between the polymer materials. For example, when the spraying frequency of the ink jet apparatus JT is increased, the distance between the polymer materials is decreased, and a thickness of the polymeric film increases. When the spraying frequency of the ink jet apparatus JT is decreased, the distance between the polymer materials is increased, and a thickness of the polymeric film decreases.

In addition, when the moving speed of the ink jet apparatus JT is increased, the distance between the polymer materials is increased, and a thickness of the polymeric film decreases. When the moving speed of the ink jet apparatus JT is increased, the distance between the polymer materials is decreased, and a thickness of the polymeric film increases.

The polymer material is a liquid material having a viscosity. Thus, after the polymer material is sprayed by the ink jet apparatus JT, the polymer material is diffused to its surroundings. Thus, when the distance between the polymer materials is relatively narrow, an area in which the polymer material is diffused is relatively small, so that the polymer materials may be relatively thickly formed. Alternatively, when the distance between the polymer materials is relatively wide, the area in which the polymer material is diffused is relatively large, so that the polymer material may be relatively thinly formed.

In addition, when a number of inkjet apparatuses spraying the polymer material is increased, the thickness of the polymer material may be increased.

Thus, a discharging rate of the ink jet apparatus JT, a spraying frequency of the ink jet apparatus JT, the moving speed of the ink jet apparatus JT, the number of the ink jet apparatus JT, a distance between the ink jet apparatuses JT, a concentration of the polymer material, a distance between the nozzles and so on, may be properly controlled to result in the desired thickness of the polymer material and the desired distance between the polymer materials.

In addition, the polymer material sprayed from the ink jet apparatus JT may not travel in the exact vertical direction to the substrate from the ink jet apparatus IT. Thus, the polymer material may not be uniformly sprayed on the substrate and a pin hole having no polymer material may be formed on a substrate, so that the alignment layer may be not uniformly formed. In addition, an end portion of the polymeric film may be misaligned in each of sub pixel areas.

In order to address these concerns, the distance between the ink jet apparatus JT and the substrate can be minimized, so that the polymer material sprayed from the ink jet apparatus JT can travel in the exact or substantially exact vertical direction to the substrate. For example, according to an embodiment, the distance between the ink jet apparatus JT and the substrate is about (100±50) μm or about 50 μm to about 150 μm.

In addition, since the polymer material is sprayed while in a liquid state, the polymer material is diffused on the substrate. If the distance between the polymer materials along the direction in which the polymer materials are printed is larger the distance between the nozzles, it may be relatively difficult to spray the polymer materials in the direction in which the polymer materials are printed. As a result, the polymer material may not be entirely formed on the substrate, and the distance along the direction in which the polymer materials are printed may be recognized at the end portion of the alignment layer by an observer.

In order to address this concern, the distance along the direction in which the polymer materials are printed can be substantially the same as or smaller than the distance between the nozzles, so that the observer may not recognize the distance along the processing direction when the polymer material is diffused on the substrate after the polymer material is sprayed.

Figure 6:
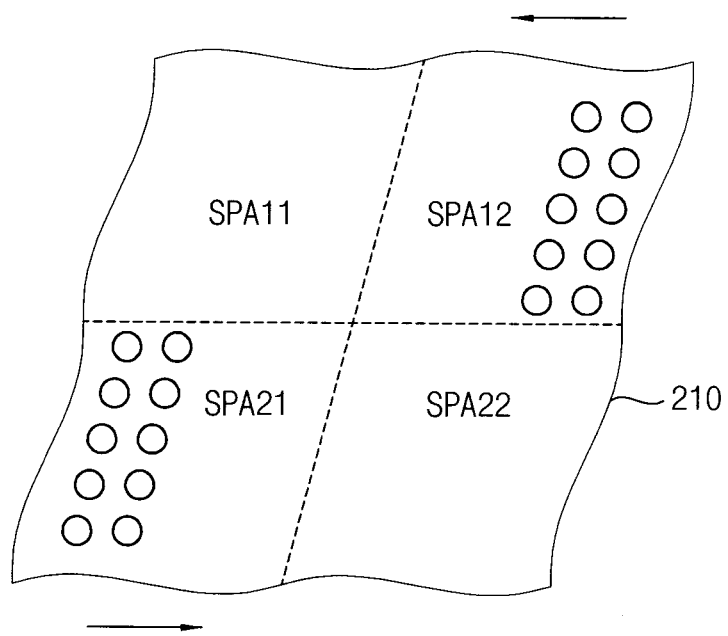
FIG. 6 is a perspective view illustrating a method of forming lower and upper polymeric films of a display panel according to an exemplary embodiment of the present invention.
Figure 6:
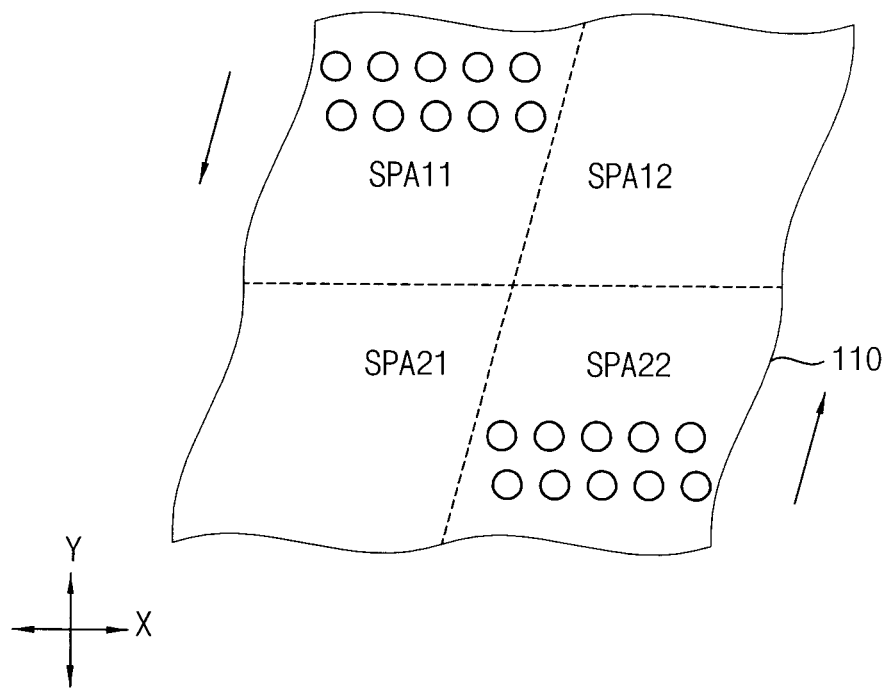

FIG. 6 is a perspective view illustrating a method of forming lower and upper polymeric films according to an embodiment of the present invention.

Referring to FIGS. 1 and 6, the polymer material is put into the inkjet head of the ink jet apparatus JT and the inkjet head is disposed over the lower base substrate 110. The ink jet apparatus JT is moved over the lower base substrate 110 and the polymer material is periodically sprayed on the lower base substrate 110, to form the lower polymeric film 180a. According to an embodiment, a mask having transmissive areas corresponding to the pixel area PA may be used to direct the polymer material to portions of the pixel area PA.

For example, a first mask opening a first column including SPA11 and SPA21 of the pixel area PA and blocking a second column including SPA12 and SPA 22 of the pixel area PA is disposed over the lower base substrate 110. The ink jet apparatus JT is disposed over the first mask and is moved along a negative Y direction. Thus, the polymer material is sprayed on the first column including SPA11 and SPA21 of the pixel area PA, along the negative Y direction.

Then, a second mask blocking the first column including SPA11 and SPA21 of the pixel area PA, and opening the second column including SPA12 and SPA22 of the pixel area PA, is disposed over the lower base substrate 110. The ink jet apparatus JT is disposed over the second mask and is moved along a positive Y direction. Thus, the polymer material is sprayed on the second column including SPA12 and SPA22, along the positive Y direction.

The polymer material is sprayed on the lower base substrate 110 to form the lower polymeric film 180a.

According to an embodiment, the upper polymeric film is formed by a method substantially the same as the method of forming the lower polymeric film 180a except for the direction and location of spraying the polymer material.

For example, a third mask opening the first row, including SPA11 and SPA12 of the pixel area PA, and blocking the second row, including SPA21 and SPA22 of the pixel area PA, is disposed over the upper base substrate 210. The ink jet apparatus JT is disposed over the third mask and is moved along a negative X direction. Thus, the polymer material is sprayed on the first row including SPA11 and SPA12 along the negative X direction.

Then, a fourth mask blocking the first row including SPA11 and SPA12 of the pixel area PA and opening the second row including SPA21 and SPA22 of the pixel area PA, is disposed over the upper base substrate 210. The ink jet apparatus JT is disposed over the fourth mask and is moved along a positive X direction. Thus, the polymer material is sprayed on the second row including SPA21 and SPA22 along the positive X direction.

The polymer material is sprayed on the upper base substrate 210 to form the upper polymeric film.

According to an embodiment, the lower and upper polymeric films may include at least one polyimide or at least one polyamicacid materials. In addition, the lower and upper polymeric films may include a mixture of polyimide and polyamicacid.

Figure 7:
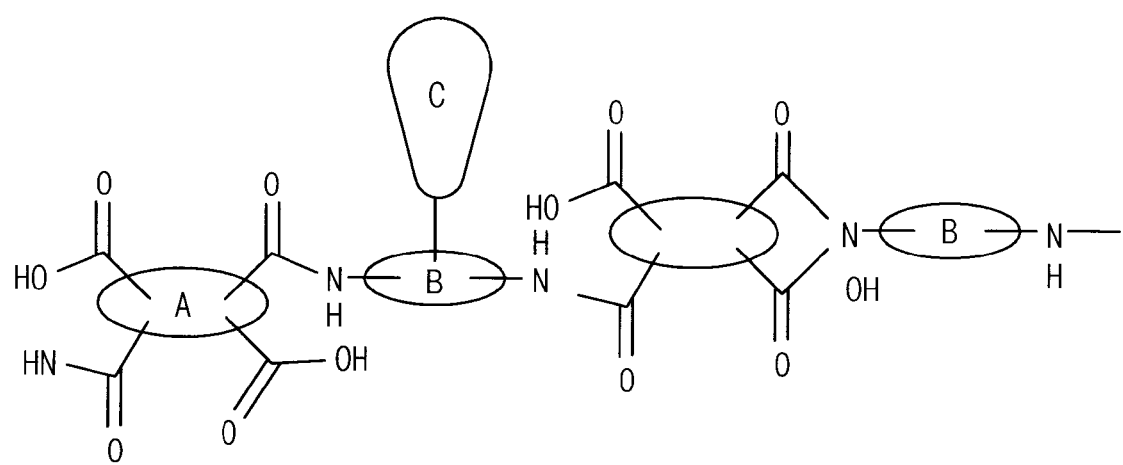
FIG. 7 is a chemical structure of a material forming an alignment layer according to an exemplary embodiment of the present invention.

FIG. 7 is a chemical structure of a material forming an alignment layer, according to an embodiment of the present invention.

Referring to FIG. 7, according to an embodiment, a material 'A' forming part of the alignment layer includes aliphatic compound.

A material 'B' forming part of the alignment layer, according to an embodiment, includes a substituent aryl group or a cyclo-hexyl group. Alternatively, the material 'B' forming the alignment layer may include a non-substituent aryl group or a cyclo-hexyl group, or other materials instead of or in addition to the aryl group or the cyclo-hexyl group.

A material 'C' forming part of the alignment layer is a vertically expressed ingredient of the alignment layer. A structure of the material 'C' is composed and optimized to vertically align the alignment layer and to pretilt an angle of the liquid crystal molecules. According to an embodiment, the material 'C' forming part of the alignment layer may include an alkyl chain, an aryl group, a hexyl group and an imide ring, but is not limited thereto. Alternatively, the material 'C' may include other materials instead of or in addition to the alkyl chain, the aryl group, the hexyl group and the imide ring. The material 'C' can be directly connected to a diamine structure or can be connected by an affinity group.

The material 'C' forming part of the vertically aligned alignment layer is inclined with respect to the alignment layer by a predetermined angle to form an alignment layer having a pretilted angle. The alignment layer having the pre-tilted angle is formed via a process in which air is sprayed as described in detail below.

An alignment material of the upper and lower polymeric films has an organic solvent including N-metil pyrrolidon of not more than about 53 wt % and butyl cellosolve of not more than about 47 wt %, mixed with an alignment forming material of about 2.5 wt %.

The air is sprayed in, for example, a jet, to form the pretilted angle of each of the lower and upper polymeric films, and, as a result, the lower and upper alignment layers 180 and 280 are formed (step 30).

Figure 8:
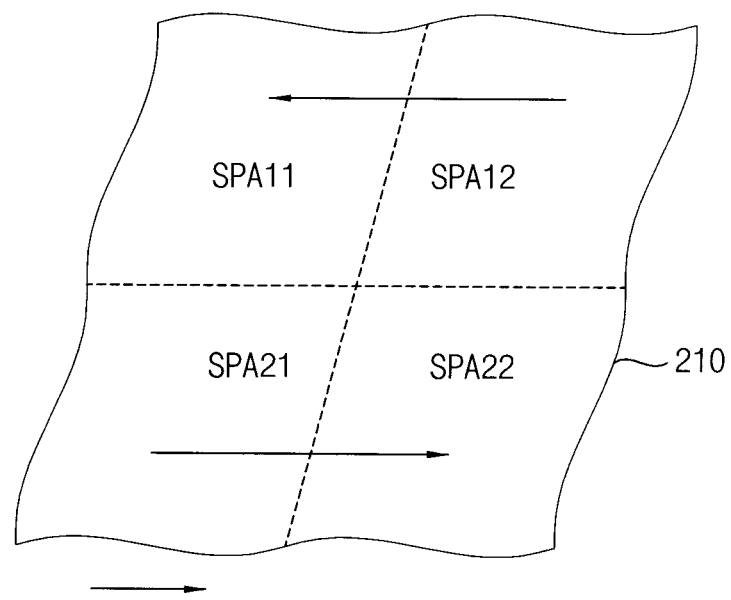
FIG. 8 is a perspective view illustrating a method of forming lower and upper alignment layers of a display panel according to an exemplary embodiment of the present invention.
Figure 8:
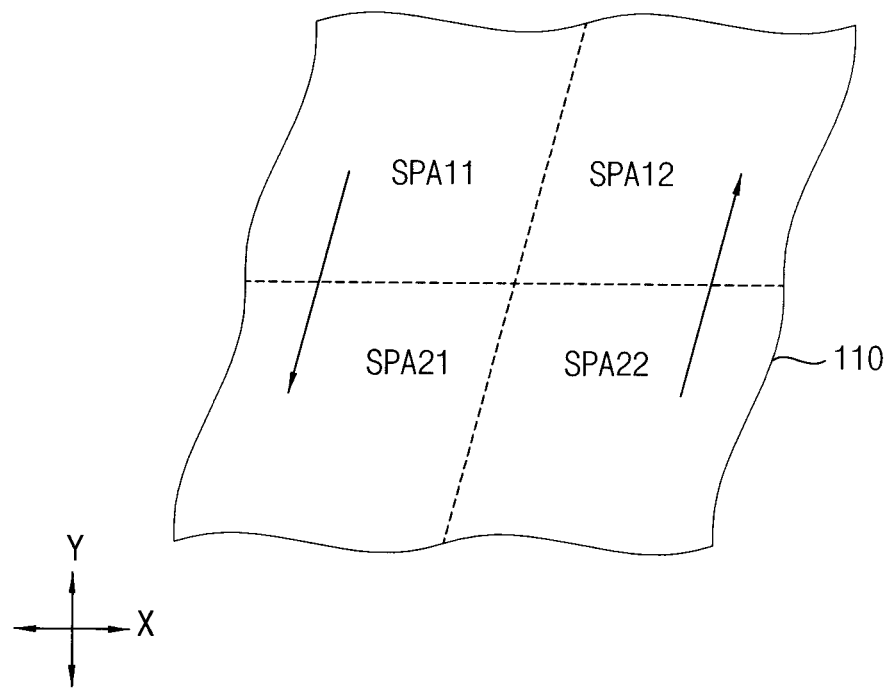

FIG. 8 is a perspective view illustrating a method of forming lower and upper alignment layers of a display panel according to an embodiment of the present invention.

Referring to FIGS. 1 and 8, the inkjet head of the ink jet apparatus JT is empty and the inkjet head is disposed over the lower base substrate 110. When the ink jet apparatus JT is moved, air is periodically sprayed on the lower base substrate 110 to form the lower alignment layer 180. For example, a mask having transmissive areas corresponding to portions of the pixel area PA can be used.

For example, the first mask is disposed over the lower base substrate 110. The ink jet apparatus JT having an empty inkjet head is disposed over the first mask and the ink jet apparatus JT is moved along the negative Y direction. The air is periodically sprayed on the first column including SPA11 and SPA21 of the pixel area PA along the negative Y direction. The polymer material of the lower polymeric film 180a in the first column is aligned in the negative Y direction by the sprayed air. For example, the material 'C' forming part of the alignment layer is inclined along the negative Y direction by the sprayed air in the first column.

Then, the second mask is disposed over the lower base substrate 110. The ink jet apparatus JT is disposed over the second mask and the ink jet apparatus JT is moved along the positive Y direction. The air is periodically sprayed on the second column including SPA12 and SPA22 of the pixel area PA along the positive Y direction. The polymer material of the lower polymeric film 180a in the second column is aligned in the positive Y direction o by the sprayed air. For example, the material 'C' forming part of the alignment layer in the second column is inclined along the positive Y direction by the sprayed air.

By spraying the air, the lower alignment layer 180 is alternately aligned along the negative Y direction and the positive Y direction.

The upper alignment layer 280 is formed by a method substantially the same as the method of forming the lower alignment layer 180 except for a direction and location of spraying the air.

For example, the third mask is disposed over the upper base substrate 210. The ink jet apparatus JT having the empty inkjet head is disposed over the third mask and the ink jet apparatus JT is moved along the negative X direction. The air is periodically sprayed on the first row including SPA11 and SPA12 of the pixel area PA along the negative X direction. The polymer material of the upper polymeric film in the first row is aligned in the negative X direction by the sprayed air. For example, the material 'C' forming part of the alignment layer is inclined along the negative X direction by the sprayed air in the first row.

Then, the fourth mask is disposed over the upper base substrate 210. The ink jet apparatus JT is disposed over the fourth mask and the ink jet apparatus JT is moved along the positive X direction. The air is periodically sprayed on the second row including SPA21 and SPA22 of the pixel area PA along the positive X direction. The polymer material of the upper polymeric film in the second row is aligned in the positive X direction by the sprayed air. For example, the material 'C' forming part of the alignment layer is inclined along the positive X direction by the sprayed air in the second row.

By spraying the air, the upper alignment layer 280 is alternately aligned along the negative X direction and the positive X direction.

The alignment direction of the upper alignment layer 280 refers to the alignment direction of the alignment layer 280 facing the alignment layer 180.

In the present exemplary embodiment, the first and second masks are used in forming the lower alignment layer and the third and fourth masks are used in forming the upper alignment layer. It is to be understood that the embodiments of the invention are not limited thereto. Alternatively, for example, the lower alignment layer may be formed without the second mask, and the first mask can be reoriented to substitute for the second mask.

According to embodiments, the pretilted angles of the upper and lower alignment layers 280 and 180 are controlled according to air spraying conditions.

TABLE 2

| Processing Factors | Increase Pretilted Angle | Decrease Pretilted Angle |
| --- | --- | --- |
| Spraying frequency | increase | decrease |
| Moving speed of air jet apparatus | decrease | increase |
| Number of moving air jet apparatus | increase | decrease |
| Number of air jet apparatus | increase | decrease |
| Distance between nozzles of air jet apparatus | decrease | increase |
| Amount of the air sprayed at once | increase | decrease |

In Table 2, processing factors affecting an increase and a decrease of the pretilted angle are shown.

Referring to Table 2, the pretilted angle may be controlled by controlling a spraying frequency of the air jet apparatus. When the spraying frequency of the air jet apparatus is increased, the amount of the air sprayed on the polymeric film is increased, so that the pretilted angle is increased. Alternatively, when the spraying frequency of the air jet apparatus is decreased, the amount of the air sprayed on the polymeric film is decreased, so that the pretilted angle is decreased.

In addition, when a moving speed or a number of moving the air jet apparatus is increased, an amount of the air sprayed on the polymeric film is increased, so that the pretilted angle is increased. Alternatively, when a moving speed or a number of moving the air jet apparatus is decreased, the amount of the air sprayed on the polymeric film is decreased, so that the pretilted angle is decreased.

The spraying frequency, the moving speed, the number of moving, the distance between air jet apparatuses, the distance between the nozzles and the amount of the air sprayed at once of the air jet apparatus can be controlled according to the required pretilted angle.

The array substrate 101 is combined with the opposing substrate 201 and liquid crystal is injected between the array substrate 101 and the opposing substrate 201 to form the liquid crystal layer 301. Referring to FIG. 2, when a voltage is not applied to the pixel electrode 170 and not applied to the common electrode 180, the liquid crystal molecules of the liquid crystal layer 301 out of the pixel area are aligned vertically with respect to each of the array substrate 101 and the opposing substrate 201.

Referring to FIG. 2, the liquid crystal molecules interposed between the lower substrate 110 and the upper substrate 210 in the pixel area PA are aligned along a synthesized alignment direction of the lower and upper substrates 110 and 210. For example, the liquid crystal molecules have a pretilted angle in the synthesized alignment direction formed by the air jet methods described above.

The liquid crystal molecules in sub-pixel areas adjacent to each other are orthogonally disposed with respect to each other, and the liquid crystal molecules in sub-pixel areas diagonally adjacent to each other are disposed different from each other by an angle of about 180°. Thus, a pixel area PA is divided into four sub-pixel areas having four pretilted angles different from each other.

According to the present exemplary embodiment, the alignment layer having a multiple alignment directions is formed without forming slits or protrusions on the pixel electrode and the common electrode to form the multi domain LCD apparatus. Thus, a transmissive rate of a pixel is not decreased by the addition of a slit or protrusion, so that the display panel 100 may be more effective at the higher transmissive rate.

In addition, since the polymeric film is formed by an inkjet method and is aligned using an air jet method, a method of forming the polymeric film is facilitated and scratching on the alignment layer that may occur during an aligning process is decreased.

In addition, since the liquid crystal molecules are aligned with pretilted angles, a response rate of the liquid crystal having a vertical alignment mode can be increased. Thus, a display quality of the display panel 100 can be increased.

Figure 9:
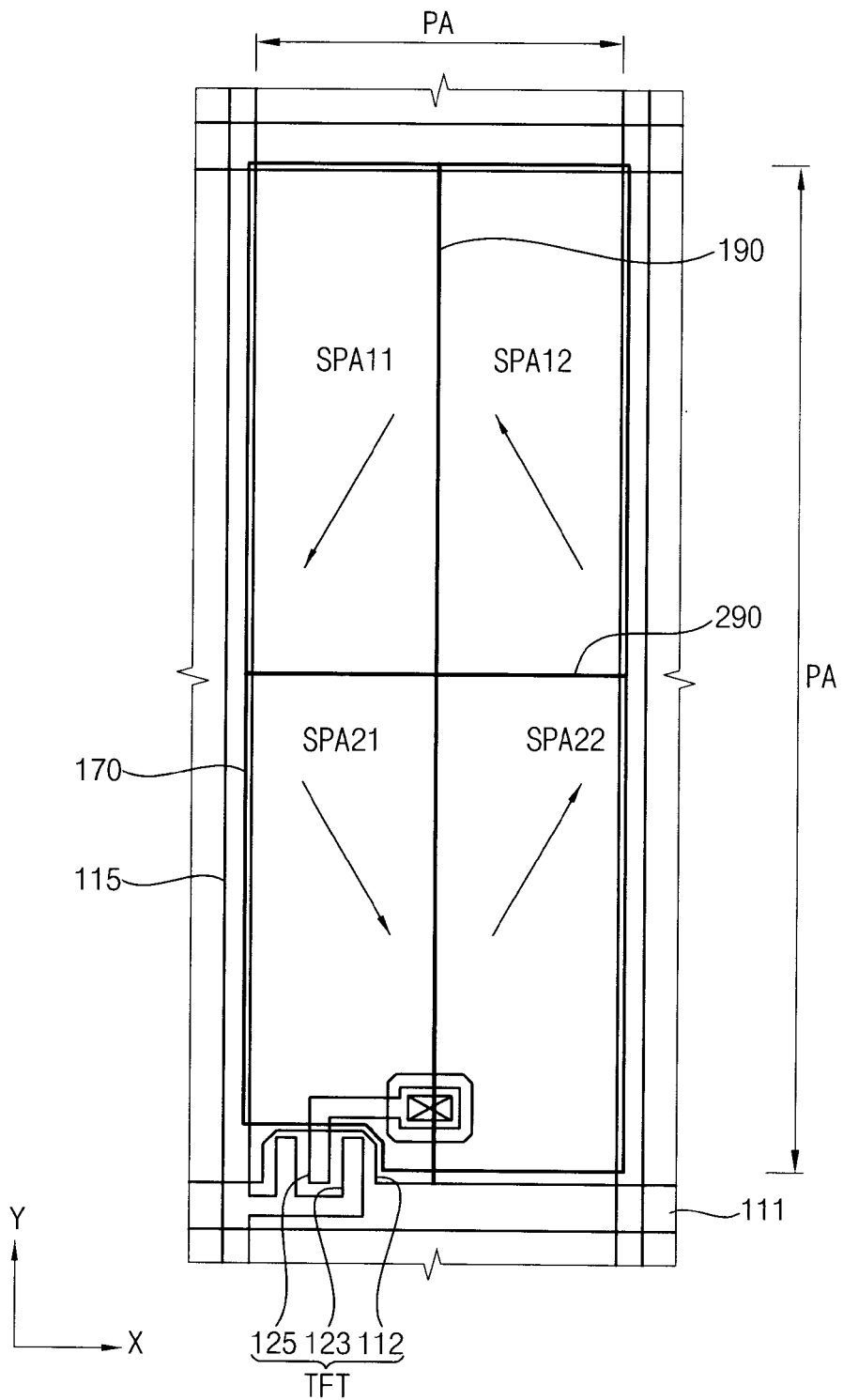
FIG. 9 is a plan view illustrating a portion of a display panel according to an exemplary embodiment of the present invention.
Figure 10:
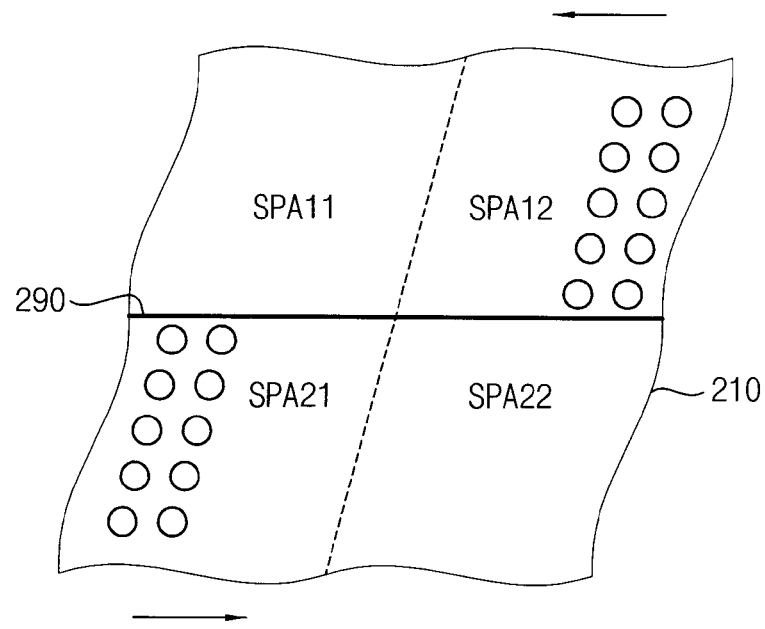
FIG. 10 is a perspective view illustrating a method of forming lower and upper polymeric films of a display panel according to an exemplary embodiment of the present invention.
Figure 10:
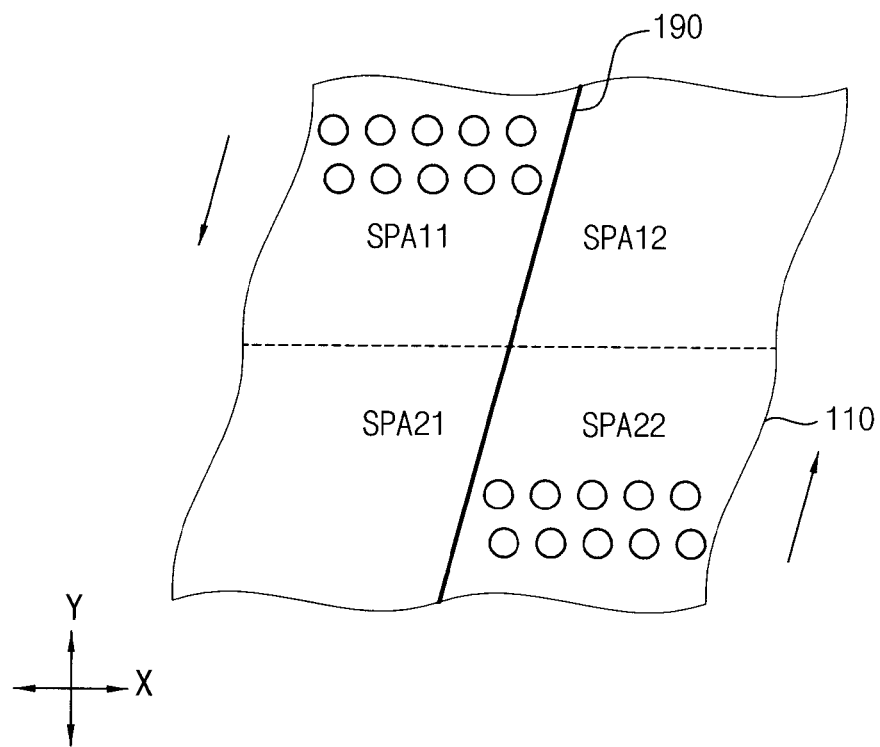

FIG. 9 is a plan view illustrating a display panel according to an exemplary embodiment of the present invention. FIG. 10 is a perspective view illustrating a method of forming lower and upper polymeric films of a display panel according to an embodiment of the present invention.

A pixel composition according to the present exemplary embodiment is substantially the same as the pixel composition of the display panel illustrated in FIGS. 1 and 2 except for further including lower and upper sub boundary portions.

Referring to FIGS. 9 and 10, the lower sub boundary portion 190 is formed on the array substrate 101. According to an embodiment, the lower sub boundary portion 190 includes a material substantially the same as a material of the gate lines 111 or the data lines 115. The lower sub boundary portion 190 is formed to correspond to a boundary between the first column including SPA11 and SPA21 and the second column including SPA12 and SPA22 of the pixel area PA.

A polymer material is sprayed on the array substrate 101 on which the lower sub boundary portion 190 is formed, to form the lower polymeric film 180a. The lower polymeric film 180a is aligned using an air jet method to form a lower alignment layer 180. The lower polymeric film 180a and the lower alignment layer 180 are formed using methods substantially the same as the methods illustrated in FIGS. 6 and 8.

An upper sub boundary portion 290 is formed on the opposing substrate 201. According to an embodiment, the upper sub boundary portion 290 includes a material substantially the same as a blocking pattern 220. The upper sub boundary portion 290 is formed to correspond to a boundary between the first row including SPA11 and SPA12 and the second row including SPA21 and SPA22 of the pixel area PA.

A polymer material is sprayed on the opposing substrate 201 on which the upper sub boundary portion 290 is formed, to form an upper polymeric film. The upper polymeric film is aligned using the air spray method to form an upper alignment layer 280. The upper polymeric film and the upper alignment layer 280 are formed using methods substantially the same as the methods illustrated in FIGS. 6 and 8.

The lower sub boundary portion 190 and the upper sub boundary portion 290 are orthogonal to each other and divide the pixel area PA into sub pixel areas SPA11, SPA12, SPA21 and SPA22. Thus, the lower sub boundary portion 190 and the upper sub boundary portion 290 are substantially the same as sub-domain boundaries of the pixel area PA.

According to the present exemplary embodiment, when the upper and lower polymeric films are formed, the polymer material sprayed from the ink jet apparatus can be prevented by the sub boundary portions 190 and 290 from being diffused from the sub-domain boundary to domains adjacent to each other, and each of end portions of the upper and lower alignment layers may be prevented from being recognized by an observer.

Figure 11:
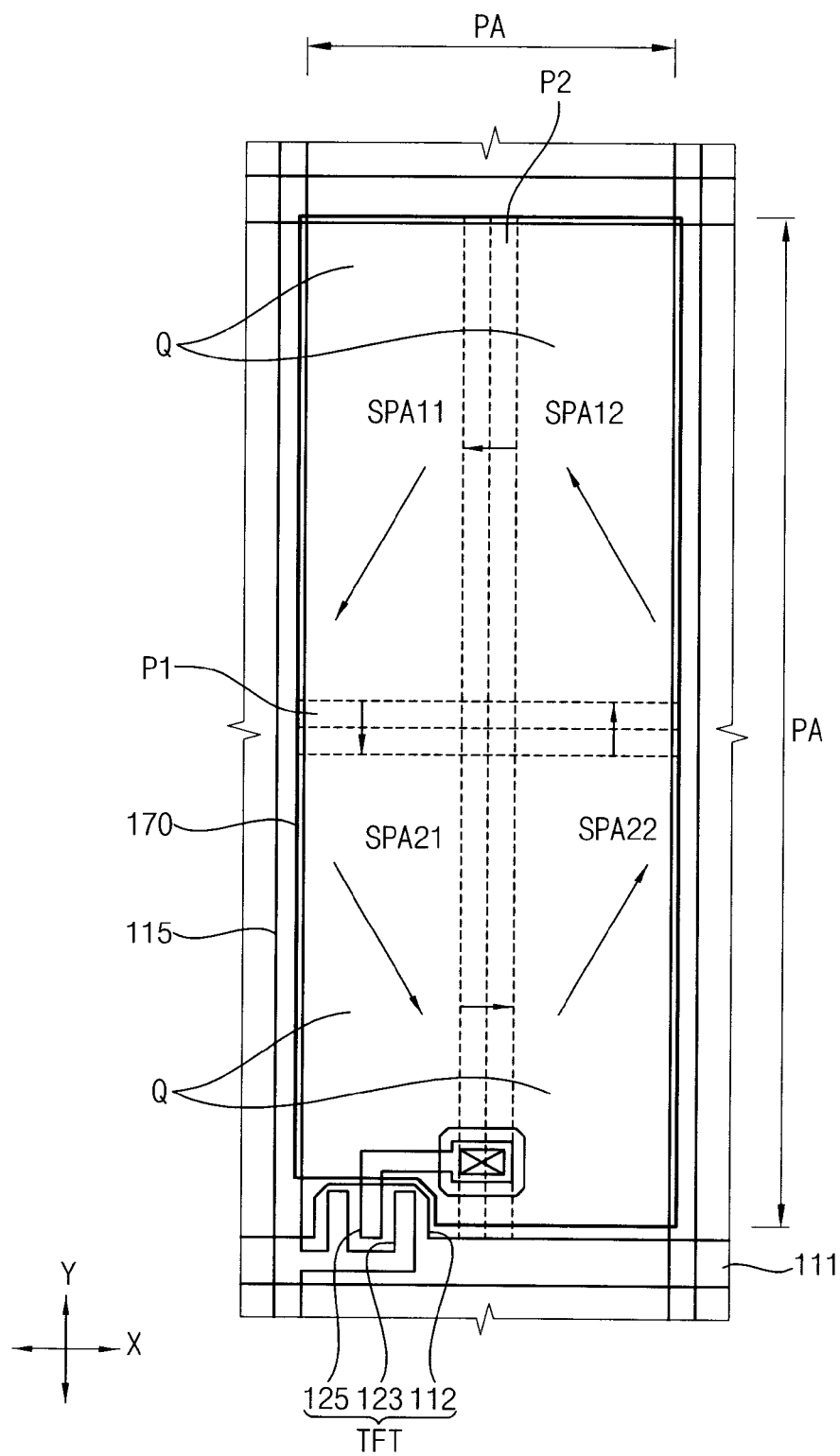
FIG. 11 is a plan view illustrating a display panel according to an exemplary embodiment of the present invention.

FIG. 11 is a plan view illustrating a display panel according to an exemplary embodiment of the present invention.

A pixel composition according to the present exemplary embodiment is substantially the same as the pixel composition of the display panel illustrated in FIGS. 1 and 2 except for non-uniformly forming a pretilted angle of an alignment layer.

Referring to FIG. 11, a polymer material is sprayed on the array substrate 101 to form the lower polymeric film 180a. The lower polymeric film 180a is aligned using an air spray method to form a lower alignment layer 180. In this case, a pretilted angle of an area P1 which corresponds to each of a boundary between SPA11 and SPA21 of the first column and a boundary between SPA12 and SPA22 of the second column of the pixel area PA is formed with larger pretilted angle than a pretilted angle of other areas Q. For example, when the pretilted angle of the area P1 in which corresponds to each of a boundary between SPA11 and SPA21 of the first column and a boundary between SPA12 and SPA22 of the second column is about 2°, the pretilted angle of other areas Q is about 1.5°.

The upper alignment layer 280 is also formed with the structure substantially the same as the lower alignment layer 180. A pretilted angle of an area P2 which corresponds to each of a boundary between SPA11 and SPA12 of the first row and a boundary between SPA21 and SPA22 of the second row of the pixel area PA is formed with larger pretilted angle than a pretilted angle of other areas Q. For example, when the pretilted angle of the area P2 which corresponds to each of a boundary between SPA11 and SPA12 of the first row and a boundary between SPA21 and SPA22 of the second row is about 2°, the pretilted angle of other areas Q is about 1.5°.

The pixel area PA is divided into four sub pixel areas SPA11, SPA12, SPA21 and SPA22 and each of the sub pixel areas has an aligned direction in a counter-clockwise direction. Thus, the aligned directions of the sub pixel areas SPA11, SPA12, SPA21 and SPA22 adjacent to each other in a counter-clockwise direction are orthogonal to each other. In addition, according to an embodiment, in the boundary area P2 between SPA11 and SPA12 of the first row and between SPA21 and SPA22 of the second row, aligned directions are vector sums of the first row and the first column and of the first row and the second column.

When the liquid crystal molecules are vertically aligned to a direction of light at the each of the boundaries between the sub pixel areas SPA11, SPA12, SPA21 and SPA22, a transmissive rate is decreased. According to an embodiment, the boundary between the sub-pixel areas SPA11, SPA12, SPA21 and SPA22 may be minimized to increase the transmissive rate of the pixel area PA. Also, according to an embodiment, the pretilted angle of the alignment layer may be increased in the boundaries between the sub-pixel areas SPA11, SPA12, SPA21 and SPA22 to minimize an area in which the aligned direction is changed.

As mentioned in Table 2, a moving speed of air jet apparatus may be decreased or a concentration or amount of sprayed air sprayed at a given time may be increased, to increase the pretilted angle in the boundaries between the sub pixel areas SPA11, SPA12, SPA21 and SPA22. In addition, according to an embodiment, the concentration or amount of the air sprayed at a given time may be increased only in the boundaries between the sub pixel areas SPA11, SPA12, SPA21 and SPA22.

According to the present exemplary embodiment, the boundary area of the sub pixel areas SPA11, SPA12, SPA21 and SPA22 recognized by an observer is decreased, so that the transmissive rate of the pixel area PA may be increased.

Figure 12:
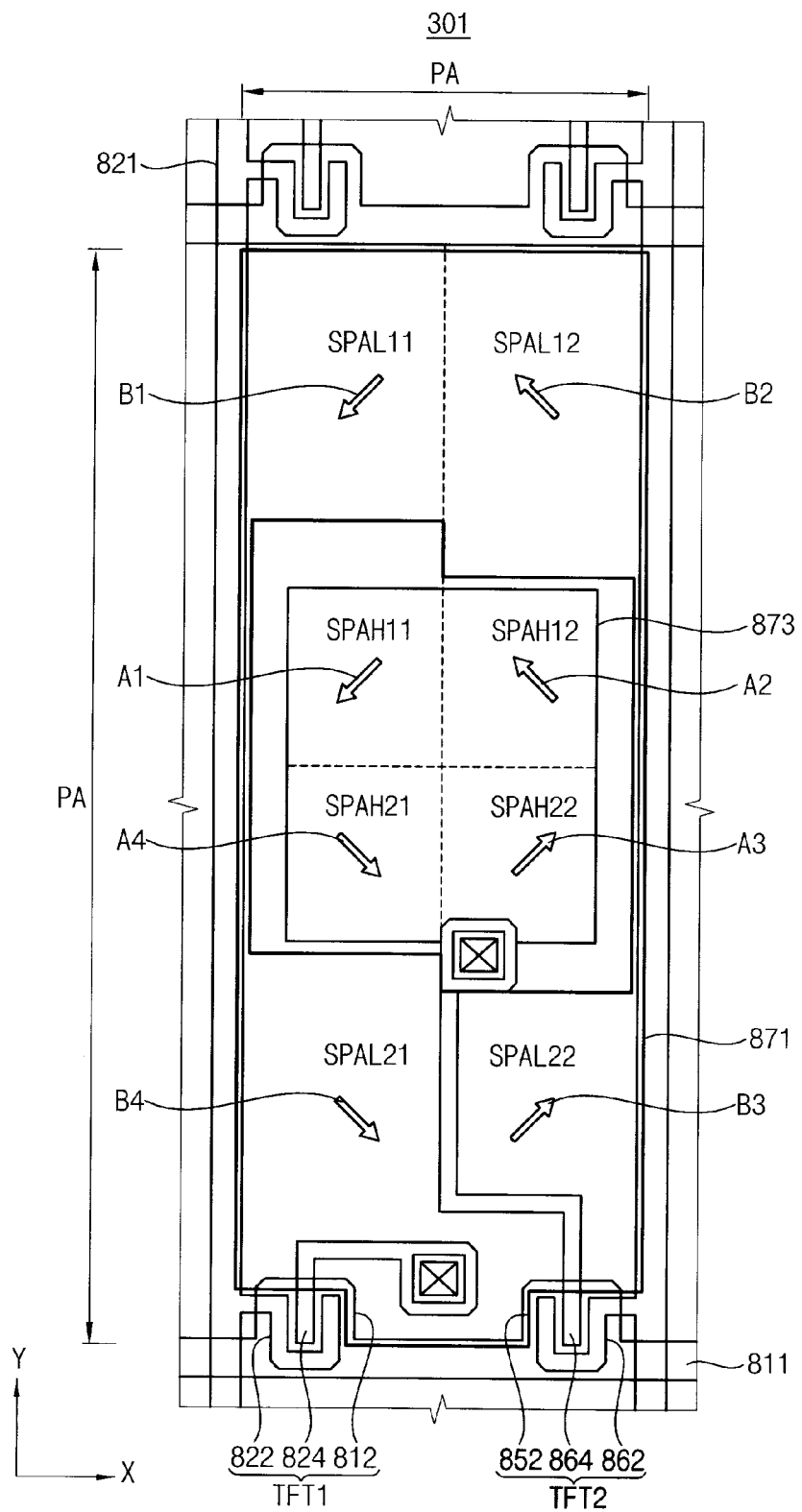
FIG. 12 is a plan view illustrating a display panel according to an exemplary embodiment of the present invention.

FIG. 12 is a plan view illustrating a display panel according to an exemplary embodiment of the present invention.

Referring to FIG. 12, an array substrate 301 according to the present exemplary embodiment is similar to the array substrate 101 illustrated in FIGS. 1 and 2. In the array substrate 301, high and low areas are separately formed in a unit pixel area and the areas corresponding to each of the high and low areas are divided into four sub pixel areas. In the present exemplary embodiment, the unit pixel area PA is divided into a high area driven by a relatively high pixel voltage and a low area driven by a relatively low pixel voltage. The high area is disposed at a center of the unit pixel area PA and the low area is disposed adjacent each of upper and lower portions of the high area.

The high and low areas are each divided into sub pixel areas. The high area is divided into four sub pixel areas SPAH11, SPAH12, SPAH21 and SPAH22 adjacent to each other and arranged in a matrix shape. Sub pixel areas SPAL11 and SPAL12 of the low area at a first row are disposed adjacent the upper portion of the high area, and sub pixel areas SPAL21 and SPAL22 of the low area at a second row are disposed adjacent the lower portion of the high area.

A low pixel electrode 871 formed on the low area is connected to a first thin film transistor TFT1 and a high pixel electrode 873 formed on the high area is connected to a second thin film transistor TFT2. The low pixel electrode 871 is spaced apart from the high pixel electrode 873. The first and second thin film transistors TFT1 and TFT2 are connected to a same gate line and are connected to data lines different from each other, in a 1-gate and 2-data line structure (1G2D).

In the present exemplary embodiment, the aligned directions of the high and low areas are aligned according to a counter-clockwise direction According to the present exemplary embodiment, a pixel electrode is divided into the low and high pixel electrodes 871 and 873, and the low and high areas are respectively connected the first and second thin film transistors TFT1 and TFT2 to be driven. The high area is disposed between the low areas, so that the pixel area PA is divided into three areas to be driven.

According to an embodiment, a high area is disposed at the upper portion of the pixel area PA and the low area is disposed at the lower portion of the pixel area PA, so that the pixel area PA may be divided into two areas to be driven.

Figure 13:
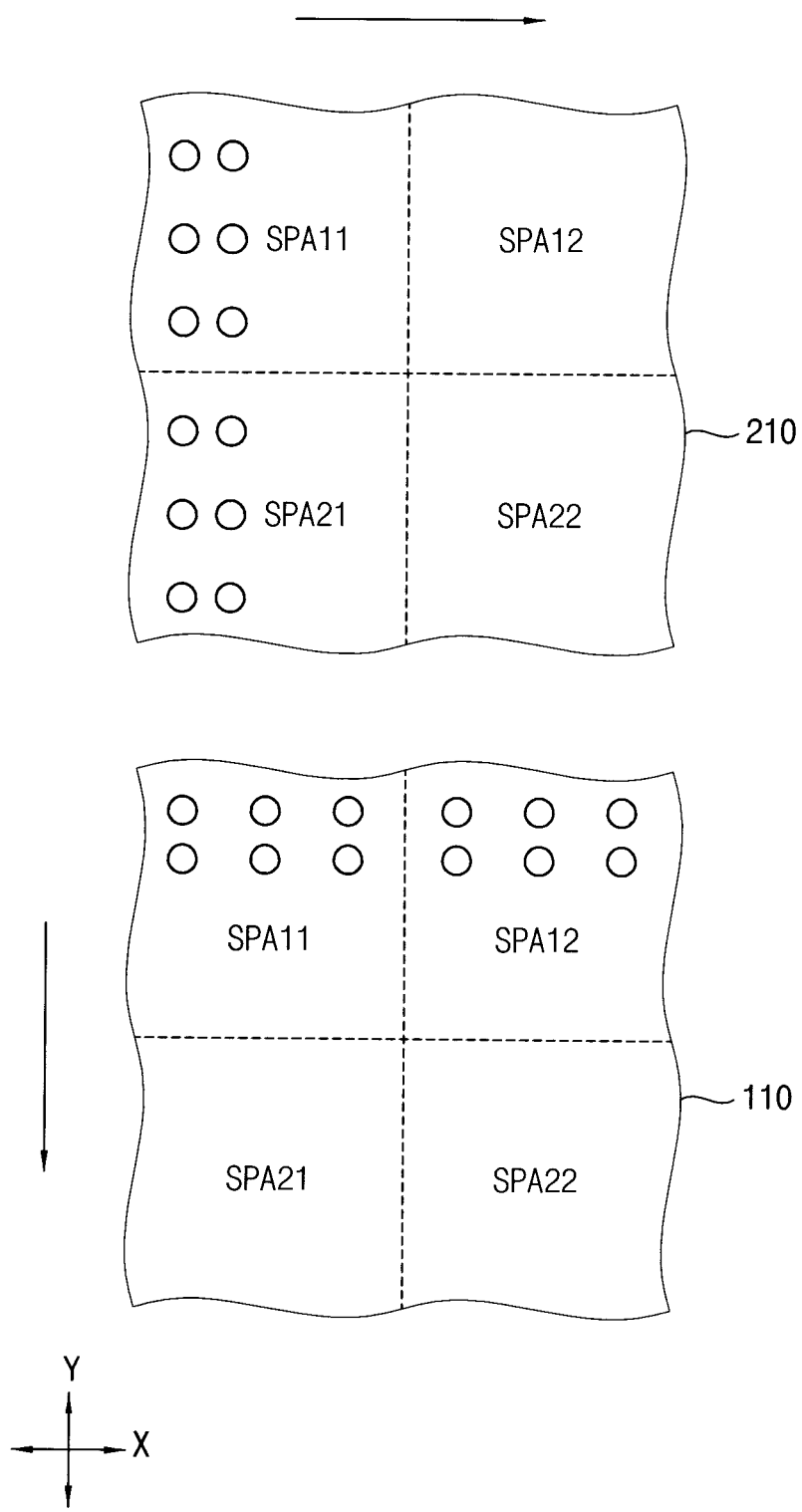
FIG. 13 is a perspective view illustrating a method of manufacturing lower and upper polymeric films of a display panel according to an exemplary embodiment of the present invention.

FIG. 13 is a perspective view illustrating a method of manufacturing lower and upper polymeric films of a display panel according to an exemplary embodiment of the present invention.

A method of manufacturing a display panel according to the present exemplary embodiment is a method substantially same as the method of manufacturing the display panel described in connection with FIG. 3 except for the step of forming lower and upper polymeric films.

Referring to FIG. 13, the polymer material is put into the inkjet head of the ink jet apparatus JT and the inkjet head is disposed over the lower base substrate 110. The inkjet apparatus JT is moved over the lower base substrate 110, and the polymer material is periodically sprayed on the lower base substrate 110, to form the lower polymeric film 180a.

In this case, the lower polymeric film 180a is printed along a same or a substantially same direction regardless of the sub pixel areas SPA11, SPA12, SPA21 and SPA22.

The upper polymeric film may be formed by a method substantially the same as the method of manufacturing the lower polymeric film 180a.

According to an embodiment, the lower polymeric film 180a is printed along the second direction Y, and the upper polymeric film is printed along the first direction X. Alternatively, the lower polymeric film 180a can be printed along the first direction X, and the upper polymeric film can be printed along the second direction Y. Alternatively, both of the lower and upper polymeric films can be printed along the same or substantially the same direction.

In the present exemplary embodiment, the polymer material is sprayed using the ink jet apparatus JT. Alternatively, according to an embodiment, the lower polymeric film 180a can be formed on the lower base substrate 110 in a same direction regardless of the sub pixel areas using a roll printing method instead of the ink jet apparatus JT.

Figure 14A:
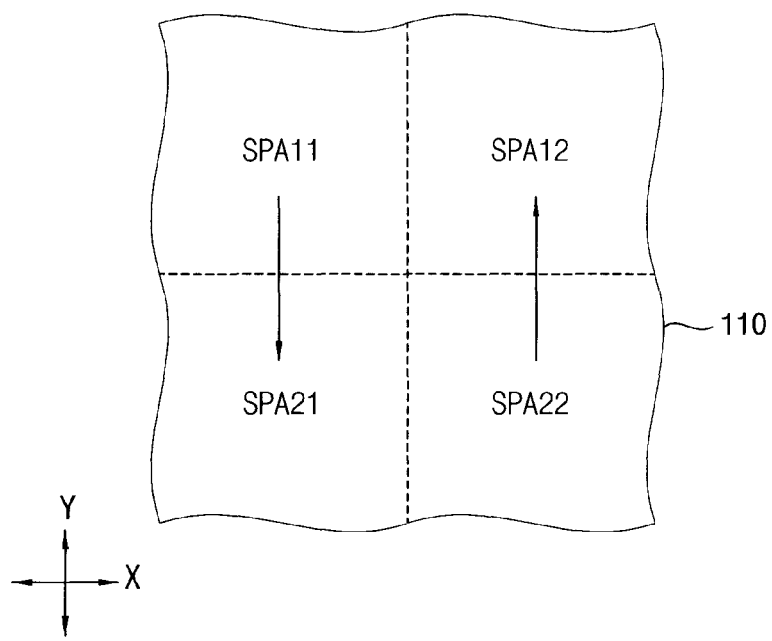
FIGS. 14A and 14B are perspective views illustrating a method of manufacturing a lower alignment layer of a display panel according to an exemplary embodiment of the present invention.
Figure 14B:
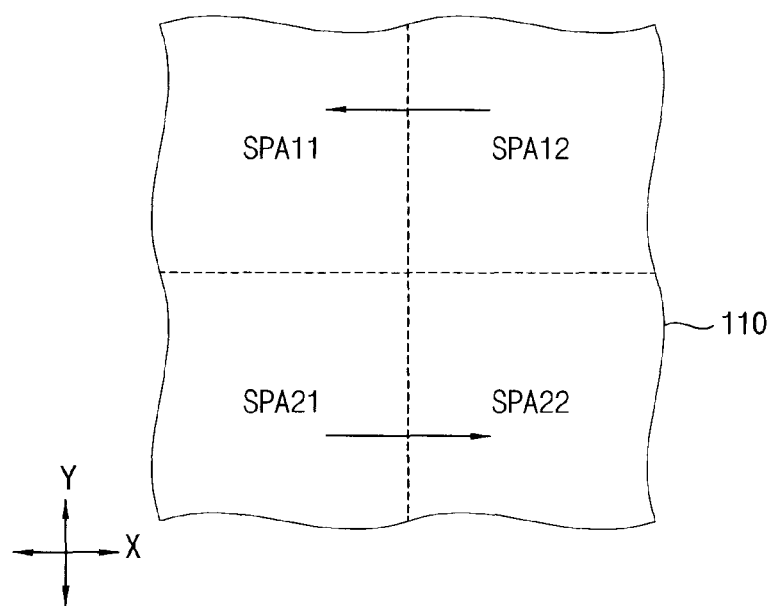

FIGS. 14A and 14B are perspective views illustrating a method of manufacturing a lower alignment layer of a display panel according to an exemplary embodiment of the present invention.

A method of manufacturing a display panel according to the present exemplary embodiment is similar to the method of manufacturing the display panel illustrated in FIG. 3 except for the method of forming pretilted angle to form an alignment layer.

Referring to FIG. 14A, an inkjet head is disposed over the lower base substrate 110 with the inkjet head of an ink jet apparatus being empty. Air is periodically sprayed on the lower base substrate 110 while moving the ink jet apparatus JT over the lower base substrate 110, to form the lower alignment layer 180. In this case, masks having transmissive areas corresponding to parts of the pixel area PA may be used.

For example, the first mask is disposed over the lower base substrate 110. The ink jet apparatus JT having the empty inkjet head is disposed over the first mask and is moved along the negative Y direction. The air is periodically sprayed on a first column including SPA11 and SPA21 along the negative Y direction. The polymer material of the lower polymeric film 180a in the first column is aligned along the negative Y direction by the sprayed air. For example, a material 'C' forming the alignment layer in the first column is inclined along the negative Y direction by the sprayed air.

Then, the second mask is disposed over the lower base substrate 110. The ink jet apparatus JT is disposed over the second mask and is moved along the positive Y direction. The air is periodically sprayed on the second column including SPA12 and SPA22 of the pixel area PA along the positive Y direction. The polymer material of the lower polymeric film 180a in the second column is aligned along the positive Y direction by the sprayed air. For example, the material 'C' forming the alignment layer in the second column is inclined along the positive Y direction by the sprayed air.

Referring to FIG. 14B, the third mask is disposed over the lower base substrate 110. An ink jet apparatus JT having an empty inkjet head is disposed over the third mask and the ink jet apparatus JT is moved along the negative X direction. The air is periodically sprayed on a first row including SPA11 and SPA12 of the pixel area PA along the negative X direction. The polymer material of the lower polymeric film 180a in the first row is aligned in the negative X direction by the sprayed air. For example, the material 'C' forming the alignment layer in the first row is inclined along the negative X direction by the sprayed air.

Then, the fourth mask is disposed over the lower base substrate 110. The ink jet apparatus JT is disposed over the fourth mask and the ink jet apparatus JT is moved along the positive X direction. The air is periodically sprayed on the second row including SPA21 and SPA22 of the pixel area PA along the positive X direction. The polymer material of the lower polymeric film 180a in the second row is aligned to the positive X direction by the sprayed air. For example, the material 'C' forming the alignment layer in the second row is inclined along the positive X direction by the sprayed air.

According to an embodiment, the last aligned directions (e.g., the positive and negative X directions in this example) are more effective than first aligned directions for controlling the aligned direction.

According to the embodiment described in connection with FIGS. 14A and 14B, the upper polymeric film is not aligned using the air jet method.

According to the present exemplary embodiment, the lower polymeric film 180a is aligned four times in the positive and negative X and Y directions. Thus, each of the subs pixel areas SPA11, SPA12, SPA21 and SPA22 is aligned along each direction and synthesized with the aligned directions in vector, which means that the liquid crystal molecules have a pretilted angle in the synthesized aligned direction.

The liquid crystal molecules in sub-pixel areas adjacent to each other are orthogonally disposed with respect to each other, and the liquid crystal molecules in sub-pixel areas diagonally adjacent to each other are different from each other by an angle of about 180°. Thus, a pixel area is divided into four sub-pixel areas having four pretilted angles different from each other.

In the present exemplary embodiment, the lower polymeric film 180a is aligned four times. Alternatively, the lower polymeric film may be not aligned and the upper polymeric film may be aligned four times to form the display panel.

Although not shown in FIGS. 14A and 14B, the array substrate 101 may further include first and second boundary lines. The first boundary line is disposed between the first row including SPA11 and SPA12 and the second row including SPA21 and SPA22. The second boundary line is disposed between the first column including SPA11 and SPA21 and the second column including SPA12 and SPA22. Both of the first and second boundary lines can include a material substantially the same as the gate line 111 and the data line 115

In addition, although not shown in FIGS. 14A and 14B, both of pretilted angles of the boundary area between the first row including SPA11 and SPA12 and the second row SPA21 and SPA22 and pretilted angles of the boundary area between the first column including SPA11 and SPA21 and the second column including SPA12 and SPA22 may be formed with pretilted angles larger than the pretilted angles of the sub pixel areas.

In addition, if the lower polymeric film 180a is not aligned using the air jet method, and the upper polymer material is aligned four times to form the display panel, the first and second boundary lines can include a material substantially the same as the light blocking layer 220.

According to the exemplary embodiments of the present invention, multiple domains may be formed in an alignment layer of a unit pixel area without forming an element like a slit pattern or a protrusion pattern, which decreases a transmissive rate of an electric field generating electrode, like a pixel electrode. Thus, the transmissive rate of the unit pixel area may be increased and a pretilted angle of an alignment layer may increase a response rate of a liquid crystal display (LCD), so that the LCD apparatus may display images more effectively.

In addition, a polymeric film is formed using an inkjet method and is aligned using an air jet method, so that the polymeric film may be more easily formed and scratching on the alignment layer that can occur in an aligning process may be decreased or prevented.

In addition, since liquid crystal molecules are aligned with pretilted angles, a response rate of the liquid crystal molecules having a vertical alignment mode may be increased. Thus, a display quality of the display panel may be increased.

The foregoing is illustrative of embodiments of the present invention and is not to be construed as limiting thereof. Although a few exemplary embodiments of the present invention have been described, those skilled in the art will readily appreciate that many modifications are possible in the exemplary embodiments. Accordingly, all such modifications are intended to be included within the scope of the embodiments of the present invention as defined in the claims.

What is claimed is:

1. A method of manufacturing a display panel, the method comprising:

forming a first polymeric film on a first base substrate, the first base substrate comprising a plurality of unit pixel areas, each of the unit pixel areas comprising a plurality of sub pixel areas arranged in a matrix shape;

spraying air on the first polymeric film along a first negative direction in the sub pixel areas of an n-th row of a unit pixel area, and spraying air on the first polymeric film along a first positive direction opposite to the first negative direction in the sub pixel areas of an (n+1)-th row of the unit pixel area to form a first alignment layer, wherein n is a natural number; forming a second polymeric film on a second base substrate, the second base substrate comprising the unit pixel areas, each of the unit pixel areas comprising the sub pixel areas arranged in a matrix shape;

spraying air on the second polymeric film along a second negative direction crossing the first negative direction in the sub pixel areas of an n-th column of the unit pixel area, and spraying air on the second polymeric film along a second positive direction crossing the first positive direction in the sub pixel areas of an (n+1)-th column of the unit pixel area to form a second alignment layer;

wherein material "C" forms a vertically expressed ingredient of said first and second alignment layers and is inclined to said direction by said sprayed air;

wherein material "C" comprises a moiety selected from the group consisting of alkyl, aryl, and imide; and, injecting a liquid crystal material between the first and second base substrates and sealing the liquid crystal material.

2. The method of claim 1, wherein sub pixel areas adjacent to each other are symmetrically aligned with respect to a boundary between the adjacent sub pixel areas.

3. The method of claim 1, wherein a polymer material is sprayed on each of the first and second base substrates using an inkjet method to form each of the first and second polymeric films.

4. The method of claim 3, wherein the first polymeric film is formed by: spraying the polymer material on the first base substrate on the sub pixel areas of the nth row along the first negative direction; and spraying the polymer material on the first base substrate on the sub pixel areas of the (n+1)-th row along the first positive direction.

5. The method of claim 3, wherein the second polymeric film is formed by: spraying the polymer material on the second base substrate on the sub pixel areas of the n-th column along the second negative direction; and spraying the polymer material on the second base substrate on the sub pixel areas of the (n+1)-th column along the second positive direction.

6. The method of claim 1, further comprising: forming a signal line capable of transmitting a driving signal of the display panel on the first base substrate; and forming a light blocking layer disposed at boundaries between unit pixel areas adjacent to each other on the second base substrate.

7. The method of claim 6, further comprising: forming a first boundary line disposed at a boundary between sub pixel areas adjacent to each other along the first positive or negative direction on the first base substrate.

8. The method of claim 7, wherein the first boundary line includes a material substantially the same as a material of the signal line.

9. The method of claim 6, further comprising: forming a second boundary line disposed at a boundary between sub pixel areas adjacent to each other along the second positive or negative direction on the second base substrate.

10. The method of claim 9, wherein the second boundary line includes a material substantially the same as a material of the light blocking layer.

11. A method of manufacturing a display panel, the method comprising:

forming a polymeric film on a first base substrate, the first base substrate comprising a plurality of unit pixel areas, each of the unit pixel areas comprising a plurality of sub pixel areas arranged in a matrix shape;

spraying air on the first polymeric film along a first negative direction in the sub pixel areas of an n-th row of a unit pixel area, and spraying air on the first polymeric film along a first positive direction opposite to the first negative direction in the sub pixel areas of an (n+1)-th row of the unit pixel, wherein n is a natural number;

spraying air on the second polymeric film along a second negative direction crossing the first negative direction in the sub pixel areas of an n-th column of the unit pixel area, and spraying air on the polymeric film along a second positive direction crossing the first positive direction in the sub pixel areas of an (n+1)-th column of the unit pixel area to form a first alignment layer;

forming a second alignment layer on a second base substrate, wherein material "C" forms a vertically expressed ingredient of said first and second alignment layers and is inclined to said direction by said sprayed air;

wherein material "C" comprises a moiety selected from the group consisting of alkyl, aryl, and imide; and, injecting a liquid crystal material between the first and second base substrates and sealing the liquid crystal material.

12. The method of claim 11, further comprising: forming a signal line capable of transmitting a driving signal of the display panel, on the first base substrate; forming a first boundary line disposed at a boundary between sub pixel areas adjacent to each other along the first positive or negative direction, on the first base substrate; and forming a second boundary line disposed at a boundary between sub pixel areas adjacent to each other along the second positive or negative direction, on the first base substrate.

13. The method of claim 12, wherein each of the first and second boundary lines includes a material substantially the same as a material of the signal line.

14. The method of claim 11, further comprising: forming a light blocking layer disposed at boundaries between unit pixel areas adjacent to each other, on the first base substrate; forming a first boundary line disposed at a boundary between sub pixel areas adjacent to each other along the first positive or negative direction, on the first base substrate; and forming a second boundary line disposed at a boundary between sub pixel areas adjacent to each other along the second positive or negative direction, on the first base substrate.

15. The method of claim 14, wherein each of the first and second boundary lines includes a material substantially the same as a material of the light blocking layer.

16. A method of manufacturing a display panel, the method comprising:

forming a first polymeric film on a first base substrate, the first base substrate comprising a plurality of unit pixel areas, each of the unit pixel areas comprising a plurality of sub pixel areas;

spraying air on the first polymeric film along a first direction in the sub pixel areas of a first row of a unit pixel area, and spraying air on the first polymeric film along a second direction opposite to the first direction in the sub pixel areas of a second row of the unit pixel area to form a first alignment layer, forming a second polymeric film on a second base substrate, the second base substrate comprising the unit pixel areas, each of the unit pixel areas comprising the sub pixel areas; and spraying air on the second polymeric film along a third direction orthogonal to the first direction in the sub pixel areas of a first column of the unit pixel area, and spraying air on the second polymeric film along a fourth direction opposite to the third direction and orthogonal to the second direction in the sub pixel areas of a second column of the unit pixel area to form a second alignment layer, wherein material "C" forms a vertically expressed ingredient of said first and second alignment layers and is inclined to said direction by said sprayed air;

wherein material "C" comprises a moiety selected from the group consisting of alkyl, aryl, and imide.

* * * * *